US012183166B2

(12) United States Patent
Lamb et al.

(10) Patent No.: US 12,183,166 B2
(45) Date of Patent: Dec. 31, 2024

(54) GAMING DEVICES AND METHODS FOR ENHANCING GAMING PAYOUTS BASED ON MATCHED GAME PLAY PREDICTIONS

(71) Applicant: KING SHOW GAMES, INC., Minnetonka, MN (US)

(72) Inventors: Jacob Lamb, Maple Grove, MN (US); Bradley Berman, Minnetonka, MN (US)

( * ) Notice: Subject to any disclaimer, the term of this patent is extended or adjusted under 35 U.S.C. 154(b) by 0 days.

(21) Appl. No.: 18/376,184

(22) Filed: Oct. 3, 2023

(65) Prior Publication Data

US 2024/0029524 A1 Jan. 25, 2024

Related U.S. Application Data

(63) Continuation of application No. 17/883,423, filed on Aug. 8, 2022, now Pat. No. 11,790,734, which is a continuation of application No. 17/083,014, filed on Oct. 28, 2020, now Pat. No. 11,410,505.

(60) Provisional application No. 62/926,700, filed on Oct. 28, 2019.

(51) Int. Cl.
*G07F 17/32* (2006.01)

(52) U.S. Cl.
CPC ...... *G07F 17/3293* (2013.01); *G07F 17/3211* (2013.01); *G07F 17/3244* (2013.01); *G07F 17/3267* (2013.01)

(58) Field of Classification Search
CPC ............. G07F 17/3293; G07F 17/3211; G07F 17/3244; G07F 17/3267
See application file for complete search history.

(56) References Cited

U.S. PATENT DOCUMENTS

| | | | |
|---|---|---|---|
| 5,823,873 | A | 10/1998 | Moody |
| 6,511,068 | B1 | 1/2003 | Sklansky et al. |
| 7,344,441 | B2 | 3/2008 | Diostilio |
| 2003/0045338 | A1 | 3/2003 | Dolloff et al. |
| 2003/0162424 | A1 | 8/2003 | Berman |
| 2013/0300062 | A1 | 11/2013 | Moore |
| 2013/0303250 | A1 | 11/2013 | Moore |
| 2014/0148231 | A1 | 5/2014 | Berman et al. |
| 2014/0287810 | A1 | 9/2014 | Berman et al. |
| 2017/0061742 | A1 | 3/2017 | Moody, Jr. |
| 2017/0087443 | A1 | 3/2017 | Milosevich et al. |

*Primary Examiner* — David L Lewis
*Assistant Examiner* — Shauna-Kay Hall

(57) ABSTRACT

Systems, apparatuses and methods for increasing or otherwise enhancing gaming awards based on correctly predicted occurrences. In a poker context, a prediction of an occurrence may be made, such as predicting a characteristic of a poker card. The prediction is compared to a random selection among a plurality of available items, such as comparing the predicted characteristic of the poker card to a random selection among a plurality of poker card characteristics. Where the prediction is correct, the player may be awarded with enhanced payouts on current and/or future game plays, and in some embodiments concurrent correct predictions results in increasingly higher enhanced payouts.

14 Claims, 12 Drawing Sheets

600
602
604
606
610
612
614
616
620
622
624
626
S
Cx
Cy
C1
C2
CHARACTERISTIC SELECTION
Cx=C1
Cy=C2
ENHANCEMENT VALUE

| RANK | MULT |
|---|---|
| A | 12 |
| K | 10 |
| Q | 8 |
| J | 6 |
| 10 | 5 |
| 9 | 3 |
| 8 | 3 |
| 7 | 3 |
| 6 | 3 |
| 5 | 3 |
| 4 | 3 |
| 3 | 3 |
| 2 | 3 |

| HAND | PAYOUT |
|---|---|
| ROYAL FLUSH | 800 |
| ⋮ | |
| THREE OF A KIND | 15 |
| 2 PAIR | 10 |
| JACKS OR BETTER | 5 |

1038 1042 1044 1046 1045 1040

| RANK | MULT |
|---|---|
| A | 12 |
| K | 10 |
| Q | 8 |
| J | 6 |
| 10 | 5 |
| 2 - 9 | 3 |

1016 1018 1020 1015 1014

GAMING DEVICES AND METHODS FOR ENHANCING GAMING PAYOUTS BASED ON MATCHED GAME PLAY PREDICTIONS

RELATED APPLICATIONS

This application is a continuation of U.S. application Ser. No. 17/883,423, filed Aug. 8, 2022, now U.S. Pat. No. 11,790,734, which is a continuation of U.S. application Ser. No. 17/083,014, filed Oct. 28, 2020, now U.S. Pat. No. 11,410,505, which claims the benefit of Provisional Patent Application No. 62/926,700, filed on Oct. 28, 2019, to which priority is claimed pursuant to 35 U.S.C. § 119(e) and which is incorporated herein by reference in its entirety.

FIELD

This disclosure relates generally to games, and more particularly to systems, apparatuses and methods for increasing or otherwise enhancing gaming awards based on correctly predicted occurrences.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to facilitate game-influencing predictions and game outcomes responsive to such predictions.

Embodiments include gaming devices that enable a player to make a prediction, and to enhance gaming payouts if the prediction proves to be accurate. In a poker context, one embodiment involves a player making a prediction as to at least one characteristic concerning playing cards, and providing a randomly-selected playing card(s) as the basis of comparison for the prediction. Current and/or future poker payouts may be enhanced if the prediction proves to be accurate. In some embodiments, the enhancement of current and/or future poker payouts may be increasingly enhanced where correct predictions occur more frequently, such as on consecutive correct predictions, X correct predictions in Y prediction attempts, etc.

One embodiment involves a multi-play poker game where multiple hands are concurrently played by the player during a poker game. The player may elect to make a prediction as to a card characteristic(s) of a card to be dealt or otherwise revealed, such as the color of the card (e.g. red suit versus black suit), the suit of the card, the number or rank of the card, and/or other perceivable characteristics. If the characteristic(s) of the dealt/revealed card ultimately matches the player's prediction of the dealt/revealed card, all hands of the current multi-play poker game are awarded a payout modifier to be applied if the respective hand ultimately obtains a poker play payout. In other embodiments, such payout modifier may be applied to a first of the multiple hands of the current multi-play poker game, and to another one of the multiple hands of the next (or other subsequent) multi-play poker game, and to yet another one of the multiple hands of the still next (or other subsequent) multi-play poker game, and so forth for the number of concurrent hands of the multi-play poker game.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
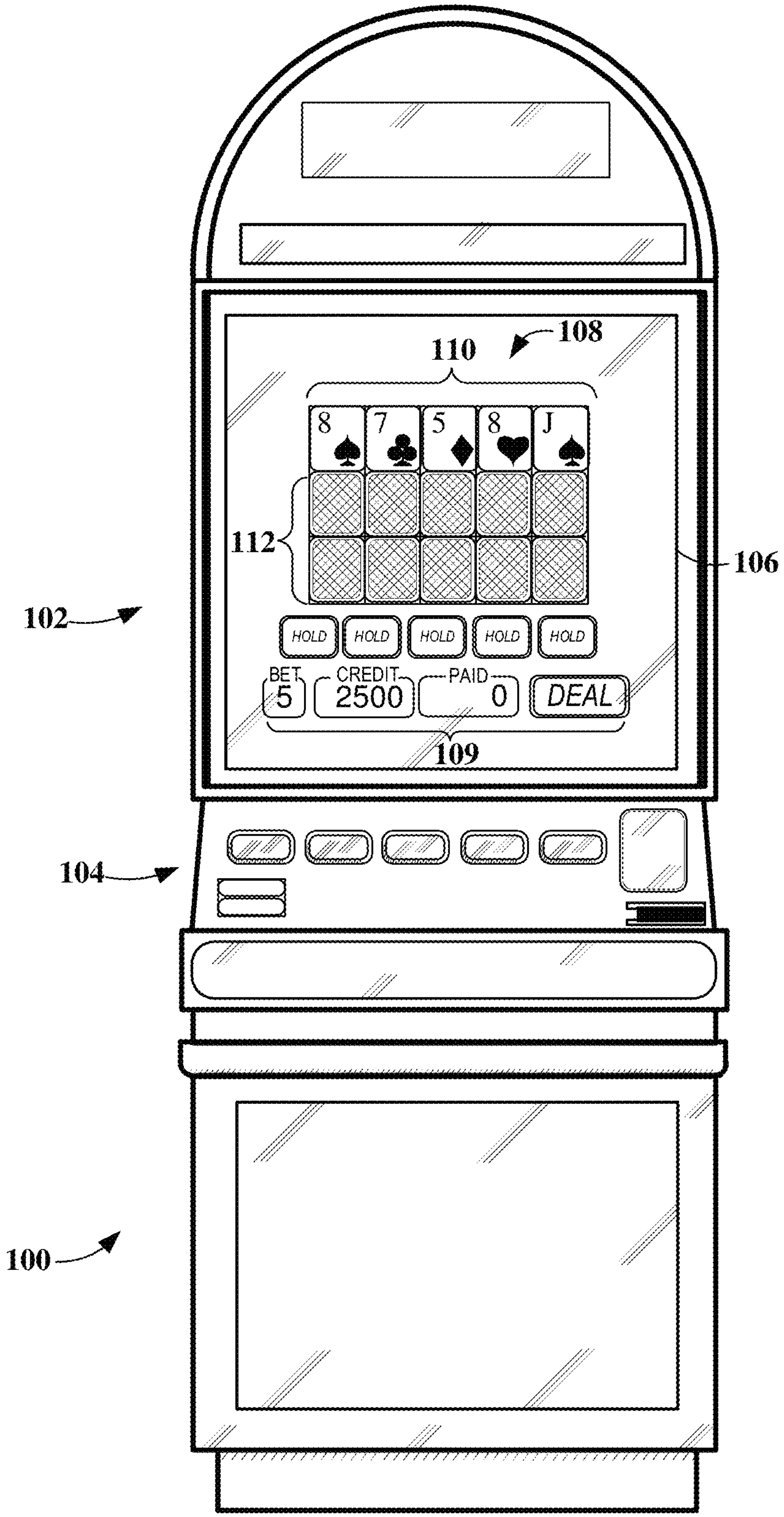
FIG. 1 is a diagram of a representative gaming machine capable of facilitating player use and interaction with games and features in accordance with the disclosure and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms "reels," "cards," "decks," and similar mechanically descriptive language may be used to describe various apparatus presentation features, as well as various actions occurring to those objects (e.g., "spin," "draw," "hold," "bet"). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatuses.

In various embodiments, the gaming displays are described in conjunction with the use of data in the form of "symbols." In the context of this disclosure, a "symbol" may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for enhancing gaming payouts by awarding payout modifiers, awards, and/or other player benefits based on conditional circumstances associated with participation in the primary game that creates the enhanceable payouts. For example, the player may select a variable or characteristic (associated with the primary game or not) in connection with (e.g., prior to) a deal of a poker hand(s), and depending on the occurrence of the selected variable, a payment enhancer (s) will be awarded on identified poker hands (e.g., a current hand(s), an immediately subsequent hand(s), a future hand (s), etc.). As a more particular example, a player can pick their lucky card color, either red or black. If the deal results in that color card in a particular hand position (e.g., position #1 of the hand, or a randomly selected position, etc.), then a multiplier or other award enhancer is awarded to any payouts or other wins on that hand and/or other hands of that deal, and/or on one or more subsequent deals. In one such representative poker context, this may continue on subsequent poker hands where the multiplier, other payout modifier, and/or other player award may be increased as a result of the card color or other selected characteristic being selected multiple times in a row.

In one embodiment, a plurality of card hands are dealt, such as (for example) a plurality of draw poker or stud poker hands. In one embodiment, the total number of those hands meeting the selected variable or characteristic further enhances any payout enhancer. For example, assume five poker hands are dealt, and three of the five poker hands meet the variable or characteristic selected by the player, such as the first card in each hand being a particular predicted color. The payout enhancer may be proportionally, or in other embodiments non-proportionally (e.g., exponentially, logarithmically, randomly, etc.) based on the total number of those hands exhibiting the variable or characteristic selected by the player (or assigned, randomly or not, in other embodiments).

As a more particular example, for a game involving three poker hands, a payout enhancer $P_1$ may be assigned if one of the hands (or in some embodiments the first hand) exhibits a player-selected characteristic (e.g., card color), where a payout enhancer $P_2$, that in one embodiment is greater than $P_1$, may be assigned if two of the hands exhibit the player-selected characteristic, and where a payout enhancer $P_3$, that in one embodiment is greater than either $P_1$ or $P_2$, may be assigned if three of the hands exhibit the player-selected characteristic.

In other embodiments, the payout enhancer may be increased if the selected characteristic is exhibited on consecutive games/plays. For example, in a poker embodiment, a hand may be dealt and played, with a card position(s) being predicted to receive a card of a particular color, suit, and/or other characteristic. If the player predicted correctly, a payout enhancer (and/or other player asset) may be awarded, and used to enhance any payout from that hand or collection of hands. However, on the next hand played by that player (e.g., the next hand of a multi-hand game, or the next hand associated with the next deal/gaming event, etc.), if the card position is again predicted correctly, the payout enhancer may be increased from the previous payout enhancer. Some embodiments allow payout enhancers to be increased as long as the characteristic prediction is consecutively predicted correctly. These and other embodiments are further described herein.

The systems, apparatuses and methods described herein may be implemented in gaming activities involving a wager, or at least a possible payout (with real or imaginary money), such as video/electronic poker games, slot games, etc., and may be implemented as a single game, or part of a multi-part game. The game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. poker, such as video poker) is provided for purposes of facilitating an understanding of the features described herein. However, as otherwise noted herein, the principles described herein are equally applicable to any game of chance where an outcome(s) is determined for use in the player's gaming activity.

Embodiments of the present concept include providing gaming devices (also referred to as gaming apparatuses or gaming machines), gaming systems, and methods of operating these devices or systems to provide game play involving identifying a predicted game characteristic(s), providing an award or award modifier if the actual game characteristic corresponds to the predicted game characteristic, and facilitating further heightened awards or award modifiers if such predictions occur consecutively or in accordance with a rule or pattern specified for the particular game or gaming event.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve symbol-based slot machine examples of this concept, other embodiments include application of these inventive techniques in other types of slot games, poker games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as "displays" or "gaming displays") that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present disclosure, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some embodiments described herein, the primary gaming portion 108 may display a grid(s) or equivalent arrangement(s) of playing cards 110 forming one or more hands or other sets of cards in a card game, such as a poker game. In the illustrated example, a set of five playing cards 110 forms a video poker hand, which represents a portion of a game play event. For example, if the game play event is a video draw poker game, the gaming device 100 may deal five cards, allow the user to select cards to hold, deal replacements for the cards not held, and determine a payout based on the final cards in the hand. The illustration and description of five-card draw poker is for purposes of example and not of limitation, as the disclosure is applicable to numerous other card games, such as stud poker or hold 'em poker, as well as other types of gaming activities and apparatuses, such as slot machines, dice, coins, etc. For example, some embodiments may relate to slot games, where the primary gaming portion 108 presents a grid (or equivalent arrangement) of symbols or other game elements in respective symbol locations (not shown), where the symbols or combinations of symbols determine gaming outcomes. In other embodiments, additional hands 112 may be dealt as part of the gaming event, where the additional hands 112 are partially involved with the original hand of playing cards

110 in that those playing cards 110 held in a draw poker game are replicated into the other hands 112, while other embodiments those hands 112 of cards may be separately played and independent of the first hand of playing cards 110.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual cards to hold and/or selection of individual cards to discard and replace (e.g., in a draw poker embodiment), which subset of cards of a larger set of cards to hold/use for a final hand(s) (e.g., in some stud poker embodiments), wagering inputs, etc. The game display 106 of the display area 102 may include other features that are not shown, such as pay tables, navigation controls, etc.

Figure 2:
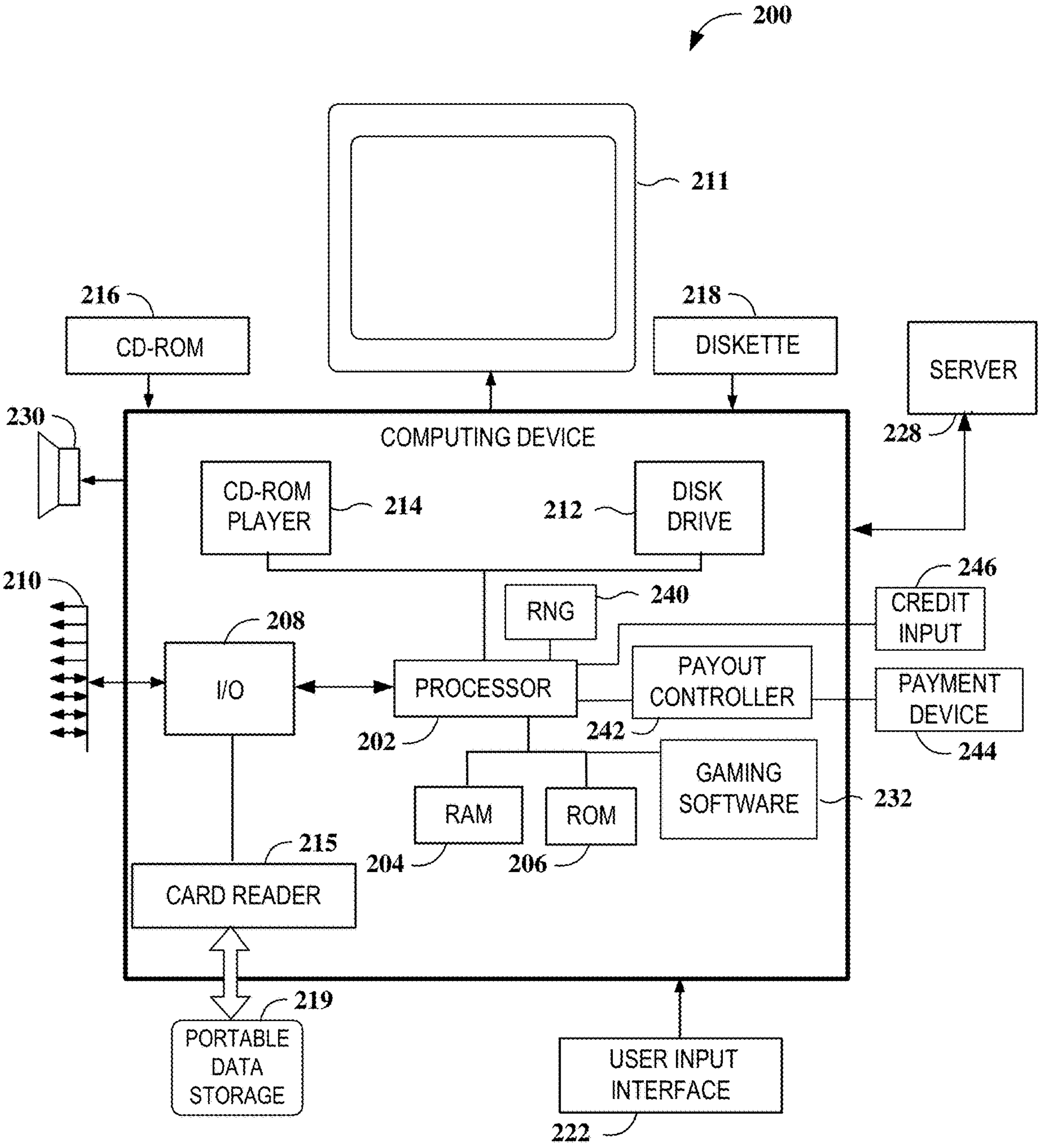
FIG. 2 is a block diagram illustrating a representative computing arrangement capable of implementing games and features in accordance with the disclosure and representative embodiments described herein.

Although FIG. 1 illustrates a particular implementation of some of the embodiments in a casino or electronic gaming machine ("EGM"), one or more devices may be programmed to play various embodiments of the disclosure. The concepts and embodiments described herein may be implemented, as shown in FIG. 1, as an electronic/video gaming machine or other special purpose gaming kiosk, or may be implemented via computing systems operating under the direction of local gaming software, and/or remotely-provided software such as provided by an application service provider (ASP). Such gaming machines may also utilize computing systems to control and manage the gaming activity, although these computing systems typically include specialized components and/or functionality to operate the particular elements of electronic gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present disclosure. Although numerous components or elements are shown as part of this computing structure 200 in FIG. 2, additional or fewer components may be utilized in particular implementations of embodiments of the disclosure.

The example computing arrangement 200 suitable for performing the gaming functions described herein includes a processor(s), such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present disclosure may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present disclosure may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display, or an electronic/video display such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the teachings of the present disclosure are also applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present disclosure may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in, for example, one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. Such software 232 may provide a video poker game, slot game, or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, a user selection, or in other embodiments a system/game random assignment, of a variable(s) in connection with the deal of cards in a poker-related game is enabled and facilitated. Depending on the occurrence of the selected variable in connection with the game, a payment(s) and/or payment modifier(s) will be awarded on the present and/or subsequent poker game plays.

In one particular embodiment, a player selects a variable, such as their lucky card color, either red or black. If the deal results in that color card in a particular hand position (e.g., position #1 or other assigned or randomly chosen location), then a multiplier or other award modifier/enhancer is awarded to something—such as the present hand, one or more subsequent hands in a multi-hand game, one or more hands of a subsequent deal, etc. In some embodiments, the multiplier or other award modifier/enhancer increases each time the player consecutively selects the correct color or other selectable characteristic.

In other embodiments, predicted characteristics need not be associated with a dealt card, but rather may be provided in any manner, such as by way of a separate dealt card(s) unrelated to other play of the poker game. For example, a player may make a prediction relating to a card characteristic, and a card uninvolved with the poker hand(s) may be presented before, during, or after participation in the play of the poker hand(s) as a means of comparison to the player's prediction. A correct prediction would provide the player with a benefit, such as a payout modifier on a subsequently played poker hand(s).

In still other embodiments, the predicted item need not be associated with the playing cards at all, such as enabling a player to make a prediction of a characteristic that is then randomly generated to determine whether a match occurred. For example, the player may be prompted to make a choice of a number between one and five, and a number between one and five is then randomly selected to determine whether the player's prediction was correct. Such embodiments may enable the player's prediction and the presentation of the randomly-generated value in any desired manner, such as presenting the randomly-generated value via a display and/or other perceivable communications (e.g. audio), or the like.

Some embodiments involve a device-generated prediction versus a player-generated prediction of the characteristic(s) in which a comparison is made. For example, the system may make random predictions of a characteristic(s), and then also make random selections to determine if the characteristic(s) match. In another embodiment, the player may allow the system to make the predictions on the player's behalf, such as by activating an auto-predict feature or otherwise notifying the system to make the predictions for the player.

Many embodiments may be described in terms of an electronic poker game, where presented cards potentially form a result(s) that conforms to a predetermined winning outcome to determine payout awards. However, the principles described herein are equally applicable to other games of chance, as described herein and as will be readily apparent to those skilled in the art from the teachings herein.

Figure 3A:
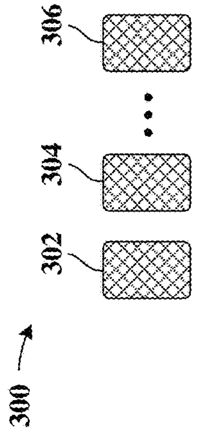
FIGS. 3A and 3B depict representative poker game embodiments implementing enhanceable poker game awards described herein.
Figure 3B:
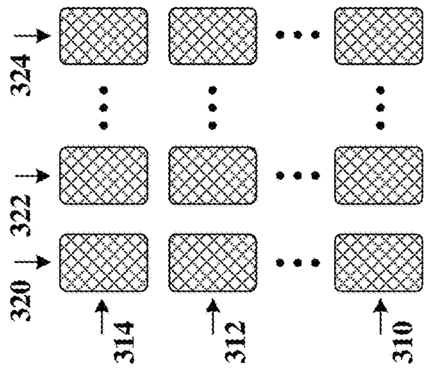

FIGS. 3A and 3B depict representative embodiments of poker game embodiments where one or more hands of cards may be part of the enhanceable poker game awards described herein. FIG. 3A depicts a hand 300 of an indeterminant number of playing cards shown as cards 302, 304 through 306. For example, the hand 300 may represent a draw poker hand, stud poker hand, and/or other poker variations. In a more particular embodiment, the hand 300 of cards may represent a five-card deal, where some cards may be discarded in favor of replacement cards (e.g., draw poker hand). In another embodiment, five or more cards may be initially dealt, and five of the cards may be used as a final hand (e.g., five-card stud, seven-card stud, etc.). The hand 300 of cards may represent any other poker variety that ultimately results in a resulting/final hand(s) where a winning hand(s) may be determined.

The cards 302, 304 through 306 may represent physical cards or other items with card indicia, may be electronic cards or other items with card indicia (e.g., such as presented via a display controlled by or otherwise operating with computing hardware), audio versions (e.g., audio notifications of the dealt cards, with or without visual accompaniment), etc. In some embodiments, the particular positions of the cards 302, 304, 306 are of little or no importance, except that one or more groupings of cards may be discernible as card hands (e.g., poker hands), or other groups of cards in which winning and losing outcomes may be identified.

FIG. 3B depicts a gaming event in which multiple hands of cards are utilized, such as a multi-play poker game. For example, a first hand of cards in the embodiment of FIG. 3B is shown at row 310 and columns 320, 322, 324. This hand may be a first or original hand in a multi-play poker embodiment. One or more additional hands may also be dealt, shown as an indeterminate number of hands including the hand with cards at row 312 and columns 320, 322, 324, and the hand with cards at row 314 and columns 320, 322, 324. As is described more fully below, the provision of payment modifiers (and/or other player assets) described herein are equally applicable to such multi-play poker environments.

In accordance with one embodiment, a payment modifier(s) may be provided as a result of a variable being successfully selected or assigned. For example, a user may select a possible outcome of a variable, and if that possible outcome occurs, the player is provided with an enhanced or otherwise modified award (or in other embodiments provided with an award or secondary award). The variable may be any desired variable, whether related or unrelated to the cards, hand, poker, or game being played. For example, the variable may be unrelated to the initially dealt poker hand, such as a guess of a color among some number of colors, and if that guessed color is randomly presented, then a payout modifier may be awarded to the poker hand payout.

In one embodiment, the variable relates to the poker hand(s) at play. For example, variables relating to the poker cards of the hand may include whether a card value is odd or even, the card color is red or black, the card is a face card or not a face card, the suit of the card, etc. Depending on the variables implemented, the player may be awarded an award modifier (or other player asset) if the player correctly guessed the result of the variable (e.g., guessed that a first card would have an odd card rank, such as 3, 5, 7, etc.). The award modifier may be provided each time the player correctly guesses the result of the variable. In one embodiment, the award modifier is provided each time the player consecutively correctly guesses the result of the variable. In still other embodiments, each consecutive correct guess results in an increased award modifier, such as a 2× multiplier for a first correct guess, a 4× multiplier for another consecutive correct guess, an 8× multiplier for another consecutive correct guess, and so forth (with some embodiments having a maximum award modifier).

One particular embodiment involves the player guessing at the color of the card(s) dealt at a particular position(s) of a poker hand that is dealt, and if the color of the card (i.e. red or black) at that position matches the guessed color, the player is awarded with a payout modifier such as a multiplier.

For example, a selection of a variable may be made prior to the deal of a poker hand, and depending on the occurrence of the selected variable, a payment enhancer(s) will be awarded for payouts resulting from that hand. In other embodiments, a payment enhancer(s) will be awarded for use with subsequent plays, such as to be applied on the next hand, or the next two hands, or for the nth hand played in the future, etc. In one such embodiment, the player can pick their lucky card color, either red or black. If the deal results in a card in a particular hand position (e.g., card position #1)

exhibiting the predicted color characteristic, then a multiplier is awarded for use with the next gaming event (e.g., next dealt poker hand).

Thus, in one embodiment, the system may facilitate player selection (or alternatively system assignment) of at least one of a plurality of card characteristics, such as cards suit color (e.g., red), card suit (e.g., spades), card value (e.g., Jack), etc. At least one hand of cards is dealt or otherwise presented to the player. It is determined whether the selected card characteristic is exhibited on a particular card in the hand (or a separate card unrelated to the hand in other embodiments), such as the first card dealt in the hand, and/or other card position(s) of the hand. Such a card position may be determined in advance, randomly selected at the time of the deal or after the deal, before or after card replacement in draw poker embodiments, or otherwise. If it is determined that the hand of cards corresponds to a winning hand having a payout value, an enhancement value is applied to the payout value if the selected card characteristic is exhibited on the particular card in the hand.

In other embodiments, the player makes a selection of the predicted card characteristic or other game characteristic, but the reference card/game characteristic is presented elsewhere than on one of the cards of the dealt hand(s). For example, a special display area may present a randomly selected characteristic/variable among the characteristics/variables in which the player is selecting, such as randomly selecting a color (e.g., blue or yellow) in an embodiment where the player is predicting either blue or yellow to appear on the special display area. As another example, the player could predict whether he/she will obtain a poker hand on an initial deal that already provides a payout, and if the dealt hand indeed produces a hand that already meets the criteria for obtaining a payout (e.g., corresponds to a winning poker hand on a paytable), then the player would receive the payout modifier. In this manner, such player selections may be utilized in slot games and other games to provide enhanced payouts in response to other winnings. For example, a slot game player may predict whether a particular symbol will be presented on a first reel, or will result in a win or loss, or the like. In such cases, one, more, or all of the payout results from that slot game event (e.g., reel spin) may be increased or otherwise enhanced by a multiplier or other modifier obtained from successfully predicting the characteristic.

One embodiment involves enabling continued multipliers, other payout modifiers, and/or other awards to be repeatedly provided when the characteristic prediction is successfully made on multiple occasions, such as multiple hands in a row. In one embodiment, the payout modifiers, awards, and/or other player asset(s) may increase each time the player successively and correctly predicts the characteristic. In one embodiment, the multiplier returns to a base value (which may be no multiplier, or a 1× multiplier) when the player guesses incorrectly.

In one embodiment, each time the player correctly predicts the characteristic(s), the payout multiplier (or other award/asset) increases, and each time the player incorrectly predicts the characteristic(s), the payout multiplier decreases. For example, such an embodiment may involve a multiplier that increases or decreases as the player correctly or incorrectly predicts the color of a card dealt to a particular card position.

Thus, some embodiments involve further enhancing an already-enhanced award when the player's predictions prove to be more successful than unsuccessful. In some embodiments, this "further enhancing" is a mathematically linear enhancement (e.g., a 2× multiplier for successfully predicting the color of a card in a first hand, and a 3× multiplier for successfully predicting the color of a card in the next/subsequent hand), where in other embodiments the "further enhancing" is a mathematically non-linear enhancement, such as an exponential increase, or anything greater than a linear enhancement (e.g., a 2× multiplier for successfully predicting the color of a card in a first hand, and a 5× multiplier for successfully predicting the color of a card in the next/subsequent hand), etc.

Figure 4:
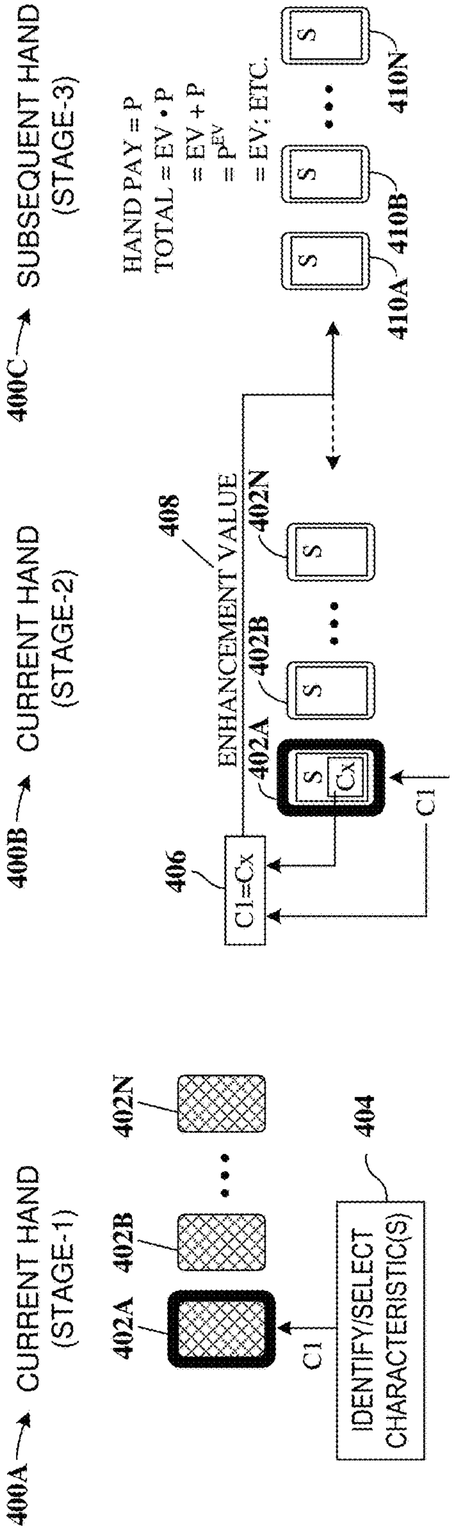
FIG. 4 depicts a representative progression of events that provide an opportunity for a player to enhance a poker payout award based on a characteristic(s) of at least one of the cards dealt in the poker hand.

FIG. 4 depicts a representative progression of events that provide an opportunity for a player to enhance a poker payout award based on a characteristic(s) of at least one of the cards dealt in the poker hand. This embodiment depicts a plurality of cards, 402A, 402B, through 402N, used in the poker hand, whether a draw poker hand, stud poker hand, Hold'em poker hand, etc. The initial deal, identified as the current hand (stage-1), represents the initial deal of cards in the particular poker game being played.

In other embodiments, the characteristic(s) need not be provided on a card associated with the poker hand, but instead (or additionally) may be provided separate from the cards of the poker hand, such as via a separate indicator, monitor, graphic, text, or other indication of what the characteristic would be. For example, a representation of a color, card suit, card number, specific card, face-card versus no face-card, and/or other characteristic(s) identifiable with the cards may be provided in a separate graphic to identify the characteristic(s) used to determine the payout enhancement.

In accordance with the illustrated embodiment, a characteristic(s) associated with at least one of the cards of the current hand 400A is predicted by the player. In other embodiments, a random prediction may be provided by the system. In a user-predicted embodiment, such as described in connection with the example of FIG. 4, the user identifies 404 a characteristic facilitated by the particular game. For example, the characteristic (C1) may be whether a particular card(s) is red or black, is of a particular card suit (e.g. diamonds), is a particular card rank (e.g. Jack) or range of ranks (e.g. face cards, or even number cards, or cards 3-5, etc.), is a particular card (e.g. Ace of Spades), etc. In the embodiment of FIG. 4, it is assumed the characteristic (C1) is whether the card 402A in the first position of the current hand 400A is red or black (e.g., is a red suit of a diamond or heart, or a black suit of a spade or club). Any position(s) of the current hand 400A may be predesignated or randomly designated, although in the example of FIG. 4A the card position is the first position of the initial deal. Thus, in a "red versus black" prediction by the player, the player guesses whether the card in the first position is a red card (i.e. any Diamond or Heart) or a black card (i.e. any Spade or Club). The identification/selection 404 of red or black constitutes the characteristic (C1) predicted by the player, and in one embodiment such identification 404 is performed before the card 402A is exposed to the player (e.g., before the deal, after the deal but before the card 402A is turned "face up," etc.).

At some point after the player has selected (or alternatively assigned by the gaming system or elsewhere) the characteristic (C1) as the predicted characteristic, the relevant card (402A in this example) is exposed to the player, as depicted at the current hand 400B, identified in this example as stage-2 of play. Each card 402A, 402B . . . 402N may be revealed, exposing the symbol (S), which may be any card (e.g., Two of Hearts, Ten of Clubs, Queen of Diamonds, etc.). Each such card, or at least the card at the designated position (card 402A in this example) includes a characteristic which is of the pool of characteristics in which the player selected the predicted characteristic (C1). For example, the pool of characteristics may include red and black in an embodiment where the card color is what is predicted by the player. Cx represents the characteristic revealed on the card 402A when exposed to the player. In accordance with embodiments described herein, if the characteristic Cx exposed on the relevant card 402A matches the characteristic C1 as depicted at block 406, an enhancement value 408 is awarded.

In one embodiment, the enhancement value 408 may be used to enhance any payout obtained from the current poker hand 400B. For example, if the player was awarded 10 credits for receiving three of a kind, and the enhancement value 408 was a 2× multiplier for successfully predicting the characteristic Cx that would be presented on the card 402A at the designated position, a total of 20 credits would be awarded to the player for the result of the current hand 400B. The enhancement value 408 applied to the current poker hand 400B may be, for example, a multiplier, exponent, addend, and/or other manner of increasing a payout or providing an award enhancement.

One embodiment involves utilizing the enhancement value 408 to enhance a payout(s) from the current poker hand 400B only. In other embodiments, a payout(s) may be enhanced from the current poker hand 400B and one or more prior and/or subsequent hands. For example, one embodiment may involve enhancing a payout(s) from the current poker hand 400B and one or more subsequent hands (e.g. subsequent hand 400C), where another embodiment involves enhancing a payout(s) from both the current poker hand 400B and one or more previously-played hands (not shown). Still another embodiment may involve enhancing a payout(s) from the current poker hand 400B, a payout(s) associated with a subsequent hand 400C, and a payout(s) from a prior hand. Thus, the enhancement value(s) 408 may be used to enhance any one or more of the current hand(s) 400B, subsequent hand(s) 400C, and prior hand(s) (not shown).

In one embodiment depicted in FIG. 4, the enhancement value 408 may be used to enhance a payout from a subsequent hand 400C, such as the immediately successive hand and/or one or more future hands. In the illustrated embodiment of FIG. 4, the enhancement value 408 may be applied to the next subsequent hand 400C that is played by the player. For example, the deal associated with the subsequent hand 400C may include cards 410A, 410B through 410N, and if play of that hand 400C results in a win of credits, the enhancement value 408 would be applied to that win of credits. As a more particular example, if the payout for that hand is represented by P, and the enhancement value is represented by EV, the total payout would be EVxP where the enhancement value is a multiplier, or EV+P where the enhancement value is an additive award, or $P^{EV}$ where the enhancement value serves as an exponent, or EV alone where the enhancement value is a value that is awarded regardless of whether the hand 400C resulted in a payout, etc. In some embodiments, the subsequent hand 400C may also provide a new characteristic selection for the player (not shown) that can then be used for the hand 400C and/or another subsequent hand(s).

Thus, FIG. 4 depicts an embodiment that illustrates where the player selects some characteristic (e.g., card color), and a card position (e.g., first card position of the hand) reveals a characteristic of the card at that position, and if the player's selection matches the presented card characteristic, an enhancement value (e.g., multiplier) is awarded to a subsequent hand. In various embodiments, the card position may be a fixed position, randomly selected for each game or other set of games, may follow a pattern, or otherwise change in a random, pseudo-random, or systematic manner.

In one embodiment, selection of the card characteristic may continue with the subsequent hand 400C, such as by allowing the player to select the card color that will be dealt to position 410A. If the player predicts correctly, the enhancement value (EV) provided from the subsequent hand 400C (not shown) to a hand subsequent to the subsequent hand 400C may be greater than the EV 408 resulting from a single correct card color prediction. For example, the EV from the subsequent hand 400C may be double that of the EV 408, and this could continue for still further hands to continue to provide increased multipliers until the player predicts the card color incorrectly. In one embodiment, the value of the EV increases for each consecutive hand in which the player guesses the characteristic(s) correctly.

As previously described, the principles described herein apply regardless of the type of poker hand being played. For example, assuming the embodiment of FIG. 4 is in the context of a draw poker game, the characteristic of card 402A of the current hand 400B may be taken from a pre-draw (i.e. initial deal) card 402A. In other embodiments, the characteristic Cx may be taken from a post-draw (i.e. "replacement") card, such as if the player elected to discard initially-dealt card 402A and was presented with a replacement card. Any manner of identifying the reference card characteristic(s) may be implemented. For example, in other embodiments, the card characteristic may be determined by the majority of characteristics of the initial (or post-draw) deal, such as how many red cards versus black cards in the initial draw (i.e., the characteristic Cx would be "red" if three or more red cards are dealt in a five-card initial deal). Other examples may include a poker rank above or below some threshold (e.g., if the poker rank exceeds three of the five cards in a five-card initial deal), a dominant suit (e.g., if more spades are dealt than other suits), etc. Any desired formulation of card characteristics may be utilized.

Figure 5:
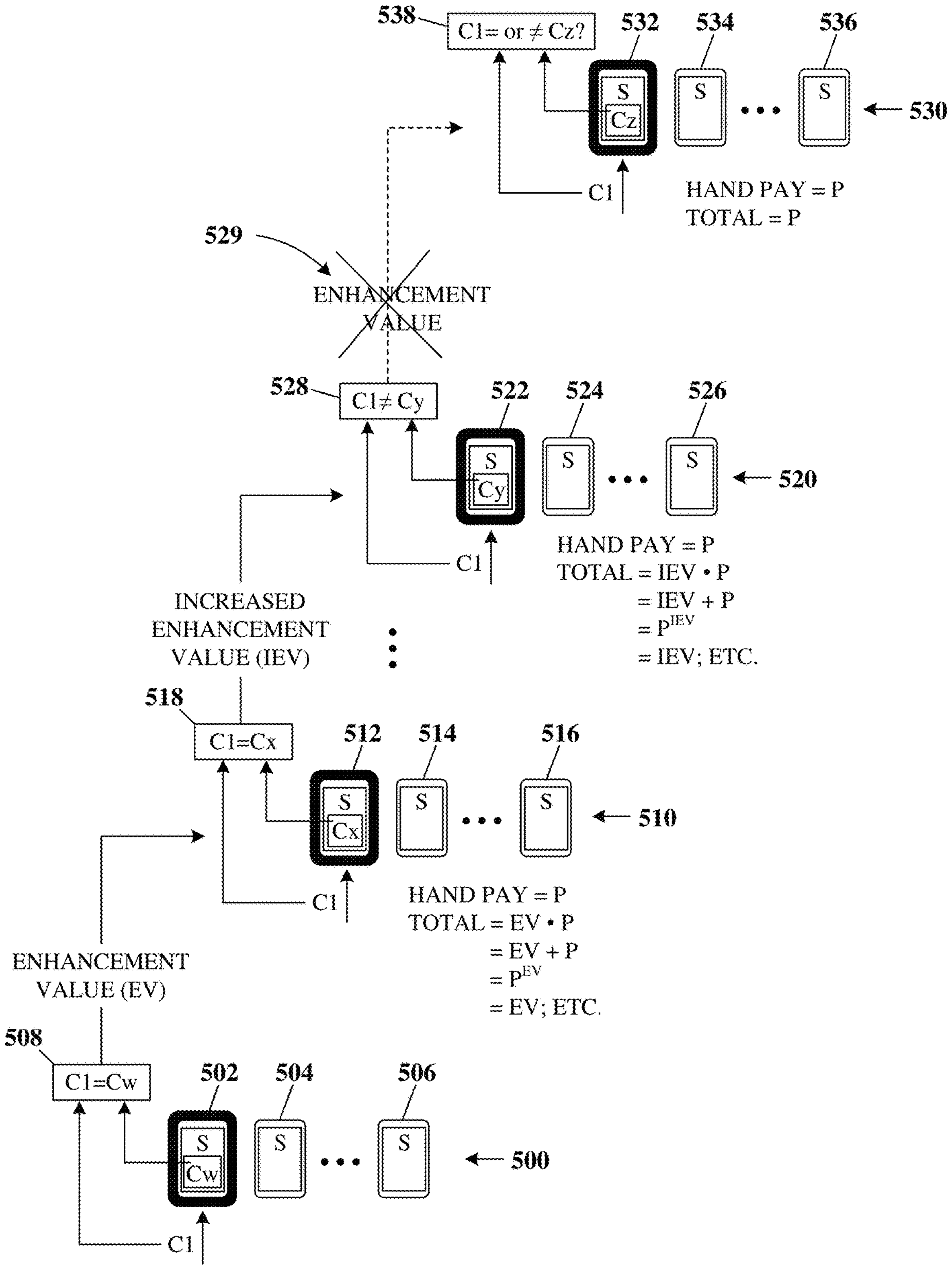
FIG. 5 illustrates an embodiment where enhancement values are applied to subsequent poker hands, where the enhancement value increases when the player consecutively, correctly predicts the card characteristics.

FIG. 5 illustrates an example where card characteristic selection continues to occur on each successively dealt hand (i.e. each distinct gaming event), whereby the current hand payout may be enhanced by the previous hand characteristic selection and match. In some embodiments, repeated correct characteristic selections by the player may increase the enhancement value (e.g., a multiplier may increase each time, or at least some times, that the player correctly predicts the characteristic of the relevant card). FIG. 5 therefore represents one embodiment where enhancement values are applied to subsequent poker hands, where the enhancement value increases when the player consecutively, correctly predicts the card characteristics.

A first hand 500 is dealt having a plurality of cards 502, 504, 506. In this embodiment, the position of the first card 502 is the card to which the characteristic Cw is predicted by the player. Before the player is notified of the characteristic Cw, the player predicts what the characteristic C1 will be. This prediction may be entered into the gaming machine via user inputs, audio input, etc. If the player's characteristic C1 prediction matches the card 502 characteristic Cw as determined at block 508, an enhancement value (EV) is awarded for application to a payout in the subsequent hand 510. If the next played hand 510 (including cards 512, 514, 516) generates a winning payout, the enhancement value EV is applied to that winning payout. For example, if play of hand 510 resulted in a poker result awarding 10 credits, and the enhancement value EV was a 2× multiplier, the total payout for that hand 510 would be 20 credits (10 credits times 2). If the EV represented some enhancement other than a multiplier, then that enhancement would be applied instead of a multiplier (e.g., an additional/summed award, an exponential award, etc.).

Additionally, hand 510 also includes a player prediction in this embodiment, whereby the player again predicts the characteristic C1. If the player's characteristic C1 prediction matches the card 512 characteristic Cx as determined at block 518, an increased enhancement value (IEV) is awarded for use in the subsequent hand 520. The enhancement value is increased in this example because the player correctly predicted consecutive characteristics of the cards 502, 512 at the designated card positions. Thus, in view of a correct prediction determined at block 518, the increased enhancement value IEV is made to be more favorable to the player than the first enhancement value EV. For example, if the EV was a 2× multiplier, the IEV may be a 3× (or better) multiplier that is used in the hand 520 that is played after hand 510. This may continue as long as the player correctly predicts consecutive characteristics of the card at the designated position, or until some other condition occurs (e.g., maximum enhancement value is reached).

Hand 520 represents a poker hand, including cards 522, 524, 526, that is played subsequent to hand 510. In this example, any winning payout from playing and 520 may be enhanced by the increased enhancement value (IEV) from the prior hand 510. In this example, the IEV is an increased enhancement value because consecutive predictions of the card characteristics occurred (i.e., the player's predictions C1 matched both Cw in hand 500 and Cx in hand 510). However, at hand 520, the player's characteristic C1 prediction did not match the card characteristic Cy as determined at block 528, and therefore no enhancement value 529 will be provided to the subsequent hand 530. Generation of additional enhancement values (including increased enhancement values due to consecutive successful predictions) may again begin at hand 530 if the player's prediction of the characteristic C1 matches the card characteristic Cz of the card 532 (or other designated card position) as determined at block 538.

It should be noted that increased enhancement values may be provided in ways other than consecutive successful predictions by the player. Thus, an increased enhancement value may be provided based on other rules. In one example, an increased enhancement value may be provided where a predetermined number of successful characteristic predictions have occurred over the last X hands. In another example, an increased enhancement value may be provided where a selected characteristic is "close" to matching (e.g., selecting a poker rank characteristic of a five and a four or six arises), while perhaps providing a "lesser" increased enhancement value than if the exact card characteristic matched the players predicted characteristic. Thus, the principles described herein involve facilitating increasing enhancement values for subsequent poker hands played, based on rules indicating how the increase will occur in view of player card characteristic predictions and ultimate card characteristics of the card(s) in the designated position(s).

Some embodiments therefore involve increasing the enhancement value provided to the player when the player has made the predictions in a predetermined manner. As noted above, one such manner is to make the predictions consecutively. In one embodiment, consecutive predictions involves consecutively played hands versus consecutive participation (e.g. payment for) in the enhancement features. In such an embodiment, if the player won a multiplier by opting into the enhancement feature (e.g. wagering an amount to become eligible for the enhancement feature), and the player elected not to opt in to the enhancement feature on a subsequent/second poker game, the player's decision to opt back in to the enhancement feature on a still subsequent/third poker game would not provide an "increased" enhancement value since a gap occurred in the player's decision to opt in to the enhancement feature. In such an embodiment, the player would need to opt in, and correctly predict the characteristic, on consecutive hands.

In another embodiment, consecutive predictions may be "consecutive" if the player made consecutive correct predictions, notwithstanding opting out of the enhancement features at times. Thus, if the player opted in (e.g. paid for participation in) the enhancement features on poker games 1, 3 and 5, the predictions would be considered consecutive wins to obtain an increased enhancement value on poker game 3 relative to poker game 1, and a further increased enhancement value on poker game 5 relative to poker game 3, notwithstanding opting out of the enhancement features on poker games 2 and 5.

In one embodiment, when the player has correctly predicted a card characteristic(s) to a designated card(s) (e.g. a card(s) in a particular card location), the multiplier is set to a higher multiplier on the next hand if the player makes another correct prediction. In this manner, the player obtains higher and higher multiplier values for each game/hand consecutively predicted correctly. For example, if the player played six (6) poker games in a row and opted in to the enhancement features on each hand, and if the player made correct red/black card predictions on each of the six hands, the multiplier would rise for each game/hand that the prediction was again correct (e.g. hand 1 correct prediction results in a 2× multiplier; hand 2 correct prediction results in a 3× multiplier; hand 3 correct prediction results in a 4× multiplier; hand 4 correct prediction results in a 5× multiplier; hand 5 correct prediction results in an 8× multiplier; hand 6 correct prediction results in a 10× multiplier). The multiplier or other enhancement may be allowed to rise or otherwise become more valuable on every successive correct prediction, or it may be capped at a maximum value, or otherwise made subject to rules to provide limits if desired.

FIGS. 6A-6E depict a manner in which the payout enhancement principles for card characteristic matching may be used in a multi-play poker environment. In a multi-play poker environment, at least a first hand is dealt, and one or more additional hands are played based at least in part on the first dealt hand. For example, in a triple-play draw poker embodiment, a first hand of five cards is dealt, the player is allowed to hold a number of cards from that first hand and replace cards that were not dealt, whereby the held cards are replicated into two additional draw poker hands. Any number of concurrently played hands may be configured in a multi-play poker environment.

Figures 6A, 6B, 6C, 6D, 6E:
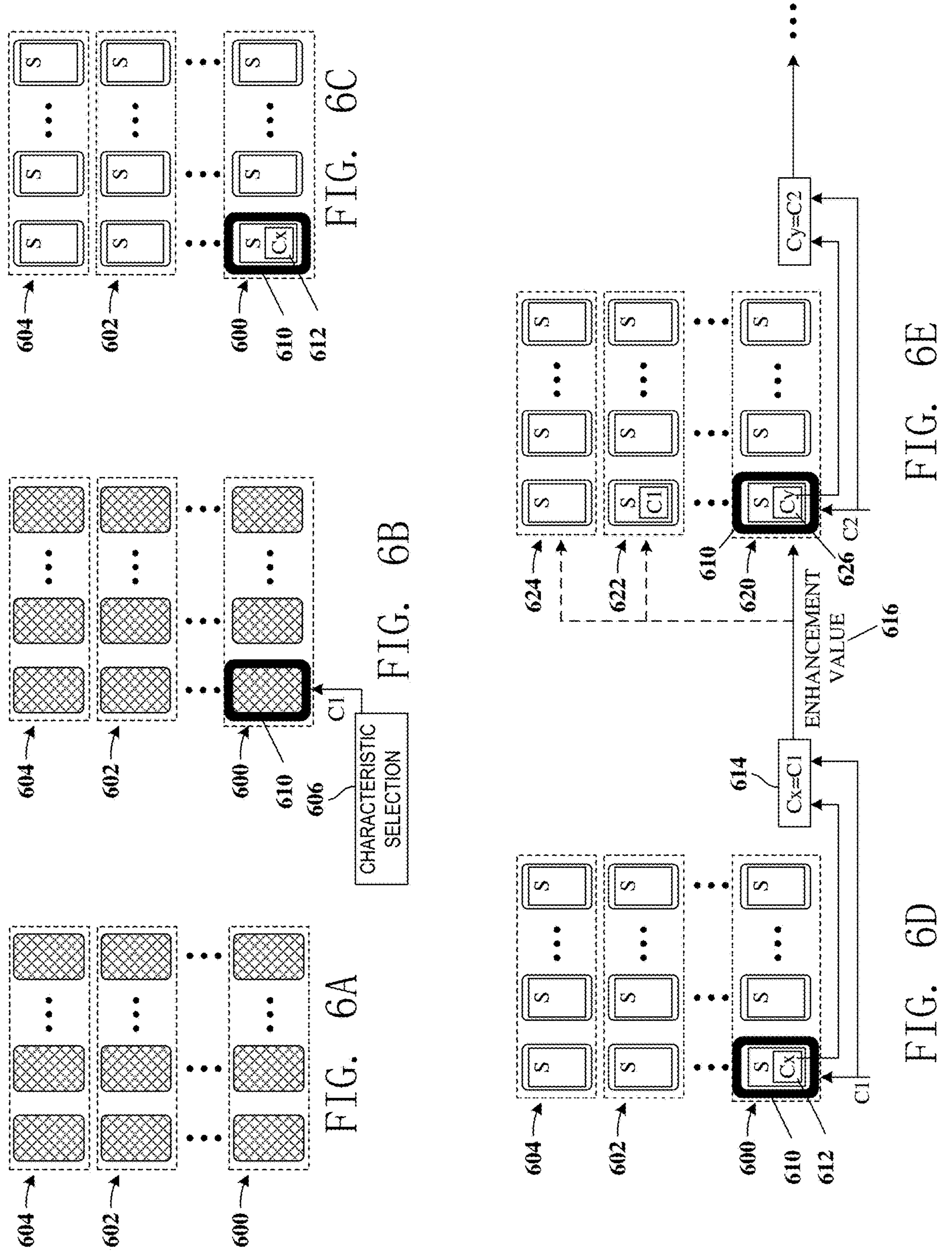
FIGS. 6A-6E depict a manner in which the payout enhancement principles for card characteristic matching may be used in a multi-play poker environment.

FIG. 6A depicts such a multi-play environment with an original dealt hand 600 of cards (e.g., five cards for draw poker), and an indeterminate number of additional hands 602, 604 of cards that are concurrently played. FIG. 6B depicts the player's selection of a predicted card characteristic C1 for a card in a designated position of the hand, such as the first card position of hand 600 in the present example. Such player prediction may be made via the characteristic selection input 606, such as a user input in an electronic gaming machine. For example, when the selectable characteristic is a card color, the player may select the color red as the predicted color (C1) of the card (e.g. a diamond or heart) that will be exposed at position 610 of hand 600 shown in FIG. 6B.

FIG. 6C illustrates when the cards of the original hand 600 have been revealed, each with an "S" indicating the symbol or indicia on the cards (e.g., rank and/or suit). In this example, each of the cards of each of the concurrently-played multi-play poker hands 600, 602, 604 are shown in their final stage, such as after cards have been held and/or replaced in the first hand 600, and cards held from the first hand 600 have been replicated into the other hands 602, 604, in a draw poker embodiment. As seen at the first card position 610 of hand 600 in FIG. 6C, a card characteristic Cx 612 is revealed in connection with exposure of the card at position 610. Where the characteristic being predicted is red or black for the card at position 610, the characteristic Cx 612 will be red or black, from which it may be determined whether the player's prior prediction of a red or black card is correct.

In the embodiment of FIGS. 6A-6E, any payout enhancement awarded as a result of the user's prediction matching the dealt card characteristic is utilized on the subsequent deal. This is depicted in FIGS. 6D and 6E, where it is determined 614 whether the player's predicted characteristic C1 matches the corresponding characteristic of the card dealt to the designated position 610. If so, the enhancement value 616 is made available to enhance a payout (if it occurs, in one embodiment) on the next hand depicted in FIG. 6E. More particularly, a new first hand 620 is dealt after the player has been awarded the enhancement value 616, and one or more additional multi-play hands 622 and 624 are also provided. If the player receives a payout in connection with play of one or more of the hands 620, 622, 624, the enhancement value 616 from the prior hand may be used to increase the payout. In one embodiment, the enhancement value 616 may be applied to one of the hands 620, 622, 624, such as a random one of the hands or a designating one of the hands, or a fixed one of the hands such as the first/lowest hand 620, etc. In other embodiments, the enhancement value 616 may be applied to a plurality of, or all of, the hand 620, 622, 624, depending on the desired rules of the particular game. A new prediction, identified as C2 in FIG. 6E, may again be provided by the player, and compared to the card characteristic Cy 626 at the designated card position 610, for use in yet another subsequent played poker hand (not shown).

In other embodiments, the enhancement value 616 is applied to one or more of the current hands in which the enhancement value 616 was awarded, such as to one, more, or all of the hands 600, 602, 604. For example, in one embodiment, the enhancement value 616 may be applied to increase a payout occurring on hand 600. In another embodiment, the enhancement value 616 may be applied to increase a payout occurring on one or more of the subsequent hands 602, 604, such as to only hand 602, or only hand 604, or to a randomly selected one of hands 602, 604, or to both of hands 602, 604, etc. In still other embodiments, the enhancement value 616 may be applied to all of the hands 600, 602, 604 of the current hand in which the enhancement value 616 was awarded. In still other embodiments, in addition to applying the enhancement value 616 to one, more or all of the hands 600, 602, 604 of the current hand, the enhancement value 616 may also be applied to one, more or all of the hands 620, 622, 624 of a subsequent hand as depicted in FIG. 6E, or to still further subsequent hands (not shown) at a later time. Thus, the enhancement value(s) 616 awarded in connection with a particular poker or other gaming event may be used to enhance payouts on, for example, one or more current, future and/or past hands in single-play or multi-play games.

Figure 7B:
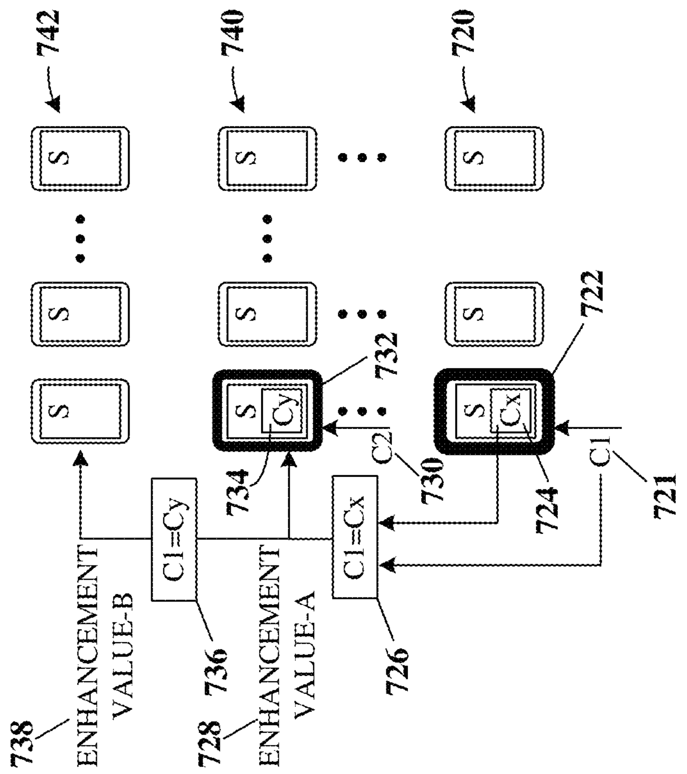
FIGS. 7A and 7B depict an embodiment where a payout enhancement awarded as a result of a correct user prediction is utilized within the same multi-play poker event, and is provided to one, more, or all of the other concurrently-played hands.
Figure 7A:
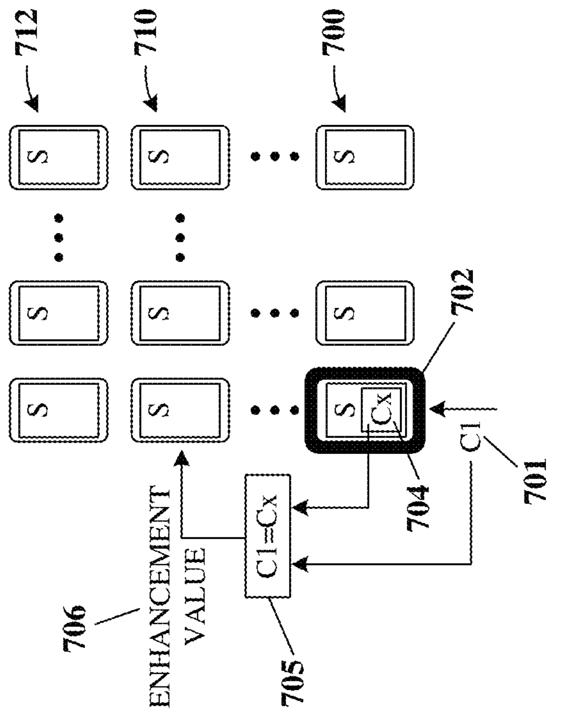

FIGS. 7A and 7B depict an alternative embodiment to that of FIGS. 6D and 6E, where any payout enhancement awarded as a result of the user's prediction matching the dealt card characteristic is utilized within the same gaming event (i.e., within the same multi-hand poker play), and is provided to one, more, or all of the other concurrently-played hands. For example, in the embodiment of FIG. 7A, the player predicted a characteristic C1 701 on the first hand 700. The card at the designated card position 702 exhibits a card characteristic of Cx 704. If it is determined at block 705 that C1 701 is equal to Cx 704, then the enhancement value 706 is awarded to one of the concurrently played hands 710, 712. In one embodiment, the enhancement value 706 is awarded to any payout on the next hand 710. In still another embodiment, the enhancement value 706 is awarded to the first one of the successive hands 710, 712 that obtains an enhanceable payout. In still another embodiment, the enhancement value 706 may be randomly applied to one of the remaining multi-play hands 710, 712. In still another embodiment, the enhancement value 706 may be applied to the other multi-play hand 710, 712 that results in the highest payout and/or poker result. In yet another embodiment, the enhancement value 706 may be applied to all of the remaining additional multi-play hand 710, 712 associated with that particular poker deal. In still another embodiment, the enhancement value 706 is applied to all of the multi-play hands 700, 710, 712 associated with that particular poker deal. These and/or other rules may be created to enable the enhancement value 706, if awarded, to be applied to one or more of the other hand 710, 712 as desired.

In an alternative embodiment, depicted in FIG. 7B, enhancement values may be determined on a plurality, or all, of the available hands in a multi-play poker context. The example of FIG. 7B is described in the context of a triple-play poker embodiment, where a first hand 720 is dealt, and two additional concurrently played hands 740, 742 are provided. In a draw poker environment, if one or more cards are held in the first hand 720, those held cards are replicated in the other hands 740, 742. In this embodiment, the player is allowed to make a prediction as to the characteristic C1 721 of a card(s), such as the card in the first card position 722 of a particular one of the hands 720. If the player's predicted characteristic C1 721 matches the characteristic Cx 724 as determined by a comparison module 726, an enhancement value-A 728 is provided for use with any payouts from another hand 740.

In this embodiment, the player is also allowed to make further predictions for additional hands that are concurrently played. In this example, the player can make a prediction as to the characteristic C2 730 of a card(s), such as the card in the first card position 732 of another one of the hands 740. If the player's predicted characteristic C2 730 matches the characteristic Cy 734 as determined by a comparison module 736, an enhancement value-B 738 is provided for use with any payouts from another hand 742. This can continue for all, or some subset, of the concurrently played hands in a multi-play poker environment. In one embodiment, predictions on hands 740, 742 may be affected if a card(s) held in hand 720 is replicated into the other hands 740, 742, so rules may be provided to address such situation. For example, holding a card in hand 720 that is replicated into hand 740 may negate a prediction for a corresponding card position in hand 740, as one could hold a card in hand 720 to ensure the prediction is correct in the following hands 740, 742, while in other embodiments this may be allowed. In one embodiment, predictions on following hands 740, 742 are made only with card positions that will not have cards held from a first hand 740 replicated therein. Such predictions may be made prior to any cards being revealed, or may be made after some subset of the cards are revealed (e.g. after the cards of the first hand 720 are shown face up). These and other manners of enabling predictions on multiple hands 720, 740, 742 of a multi-play poker game may be employed.

It should be noted that in any embodiment described herein, the player may be able to make such predictions for potential payout enhancements without additional wagers, while in other embodiments there may be a cost associated therewith. For example, the player may make a side wager or other additional wager to participate in the payout enhancement features described herein. In one embodiment, there may be a first cost to play in a single-hand poker game, such as one credit, where a charge of one additional credit may be required to participate in the payout enhancement features described herein (e.g. a "1+1" cost scheme). Similarly, for higher wagers such as five credits, there may be correspondingly higher cost to participate in the payout enhancement features, such as an additional five credits (e.g. a 5+5 cost scheme). Or, the cost to participate in the payout enhancement features may be more or less than the cost of the game, such as a 5+1, 5+2, or 5+10 structure (e.g. standard wager of five credits, with various embodiments to participate in the payout enhancement features involving an additional one, two, or ten credits respectively). As this illustrates, the pay structure may be made as desired and/or in accordance with the mathematical calculations involved to make the poker/gaming apparatus provide payouts at a desired percentage of the placed wagers.

Figure 8:
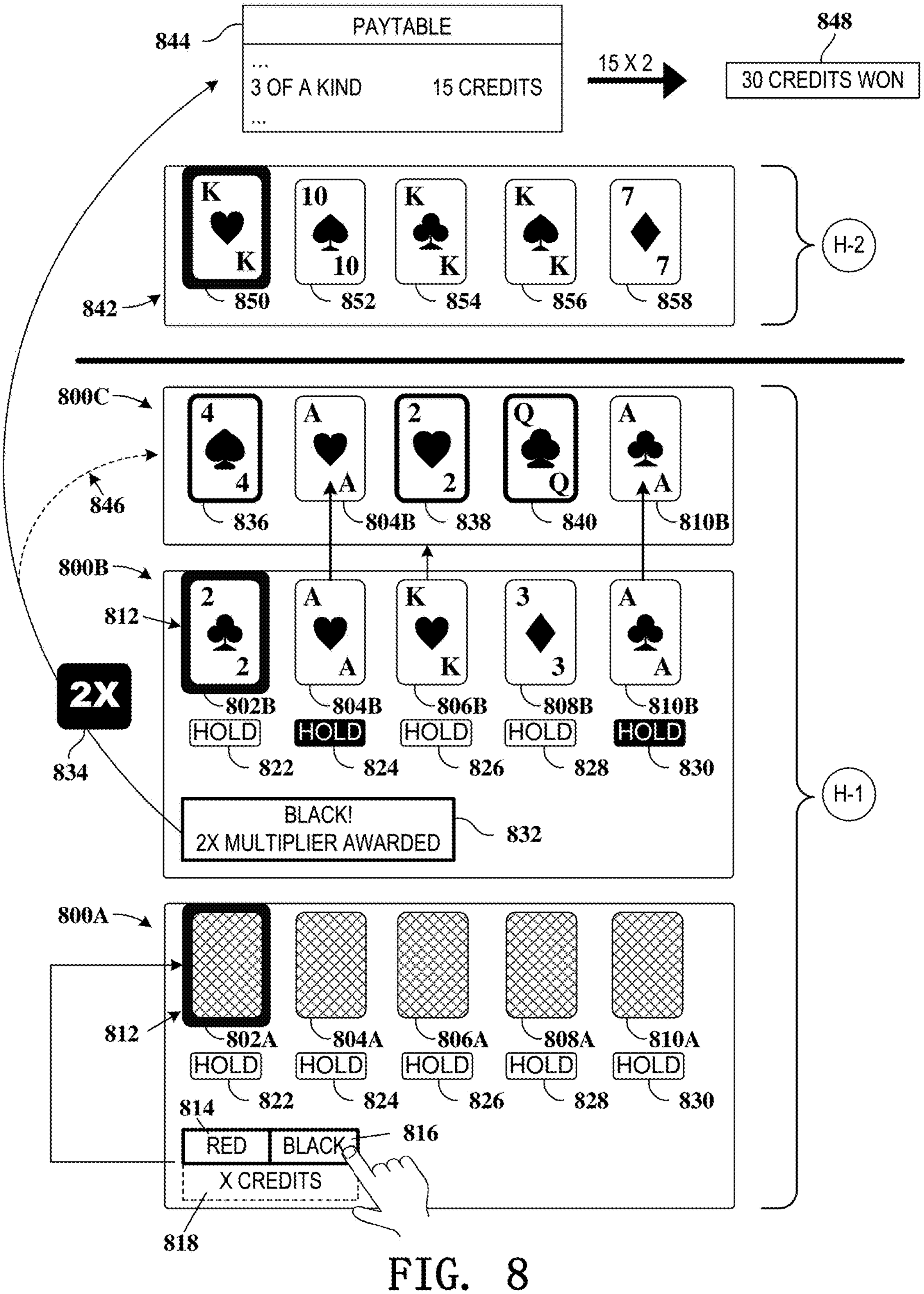
FIG. 8 is a diagram of a representative presentation of a card characteristic prediction and payout modifier feature for an electronic poker game.

FIG. 8 is a diagram of a representative electronic poker game incorporating a presentation of a card characteristic prediction and payout modifier feature as set forth herein. The present example assumes a draw poker environment, although the principles described herein are equally applicable to stud poker and other poker games. A first poker hand, H-1, is depicted having three stages of the hand, shown as stages 800A, 800B, 800C. The first stage, 800A, represents the initial deal of the poker hand having cards 802A, 804A, 806A, 808A and 810A, before the player has seen the cards, or at least before the player has seen the card at the card position 812 that is used for the card characteristic prediction. The card position 812 could be at any position of the initial hand 800A, whether determined in advance, selected randomly, etc. In this embodiment, the card characteristic being predicted by the player is the color of the card at card position 812, namely, whether the card that is exposed at position 812 will be a red card (diamond or heart) or a black card (club or spade). A user interface may be presented visually and/or audibly, and in the present example is presented visually with a RED 814 choice and a BLACK 816 choice. In the illustrated embodiment, it is assumed that the player has predicted that a black card will be presented at card position 812, as depicted by the player selecting the BLACK 816 user interface option.

In some embodiments, a selection, or notification 818 may be provided to notify the player that there is a cost associated, such as a side bet, to gain access to the card characteristic prediction and payout modifier feature. In other embodiments, the card characteristic prediction and payout modifier feature may be built in to the standard poker wagering scheme. As this is a draw poker embodiment, other user interface items are provided to enable the player to hold or discard cards, depicted as the HOLD user interface mechanisms 822, 824, 826, 828, 830 (e.g., touch screen, buttons, joystick, audio command, etc.).

After the initial deal, and after the user has (optionally in some embodiments) selected the card characteristic of RED 814 or BLACK 816, a second stage 800B of the hand H-1 is revealed, whereby the cards 802B, 804B, 806B, 808B and 810B are exposed, including the card 802B at the card prediction position 812. In this example, the 2-Clubs has been revealed at card position 812, which is a black card (club). Because the player had predicted that a black card would be presented at card position 812, the player is awarded with a payout modifier, which is a multiplier in this example (and a 2× multiplier 834 in this particular example). The gaming apparatus may provide this information audibly and/or visually to the player, as noted by presentation window 832 which may be provided via a display and/or indicated audibly via a speaker or otherwise.

The player continues playing the particular poker hand H-1 by holding any desired cards 802B, 804B, 806B, 808B, 810B, which results in retaining such health cards to the final stage 800C, while discarding cards that were not held in lieu of replacement cards. For example, in the illustrated embodiment, the player has activated user interface mechanisms 824, 830 in order to hold the Ace-Hearts 804B and Ace-Clubs 810B, which are retained to the final hand 800C. The other cards 802B, 806B and 808B are discarded, and replaced by cards 836, 838, 840. The final hand 800C resulted in a pair of Aces. If the paytable 844 provides for a payout for pairs (or at least a pair of Aces), then the player would receive a payout in response to the final hand 800C.

The paytable 844 may represent any desired paytable, which may include payouts for any one or more of, for example, a pair (or a minimum pair, such as Jacks or better), two pairs, 3-of-a-kind, straight, flush, full house, 4-of-a-kind, straight flush, royal flush, etc., often with a progressively higher payout as the statistical chances of obtaining the particular result decrease.

In one embodiment, the awarded 2× (or other) multiplier 834 is provided to the next hand H-2 played, as will be described in greater detail below. However, the awarded multiplier 834 (or other payout enhancer) may instead or additionally be applied to a present hand H-1 payout (e.g., see dashed line 846), or any other payout award associated with the game, whether the present hand, an immediately subsequent hand, a hand selected randomly or via rules in the future, a plurality of hands, etc.

In the present example, the 2× multiplier 834 that is awarded in connection with hand H-1 is made available for use to a payout in the immediately successive hand H-2. Hand H-2, including final cards 850-858, depicts only the last stage or final hand 842 for purposes of illustration, which in this example resulted in 3-of-a-kind in Kings (i.e. cards 850, 854, 856). The representative paytable 844 indicates that 3-of-a-kind pays 15 credits in this example, and by applying the 2× multiplier 834 awarded in the prior hand H-1, the resulting payout is 30 credits (15 credits×2), which may be presented via a display window 848 or made known to the player in any desired manner. Thus, the card characteristic prediction and payout modifier feature enabled the player to obtain a higher, or enhanced/modified, payout for a hand H-2 based on a successful card characteristic prediction in a prior hand H-1.

The principles described in connection with FIG. 8 and otherwise herein are equally applicable to multi-play embodiments. For example, if the hand H-1 was a triple-play embodiment where three hands are concurrently played, any awarded modifier 834 could be applied to hands of the poker game as dictated by the rules. As a more particular example in a triple-play environment, the player may be allowed to predict a card characteristic(s) analogously to that described in connection with FIG. 8, and if successfully predicted, may apply that payout modifier 834 to any one or more of the hands of the current triple-play hand, and/or to any one or more of the hands of the next/subsequent triple-play hand, and/or to any one or more hands associated with play of the poker game.

Figure 9A:
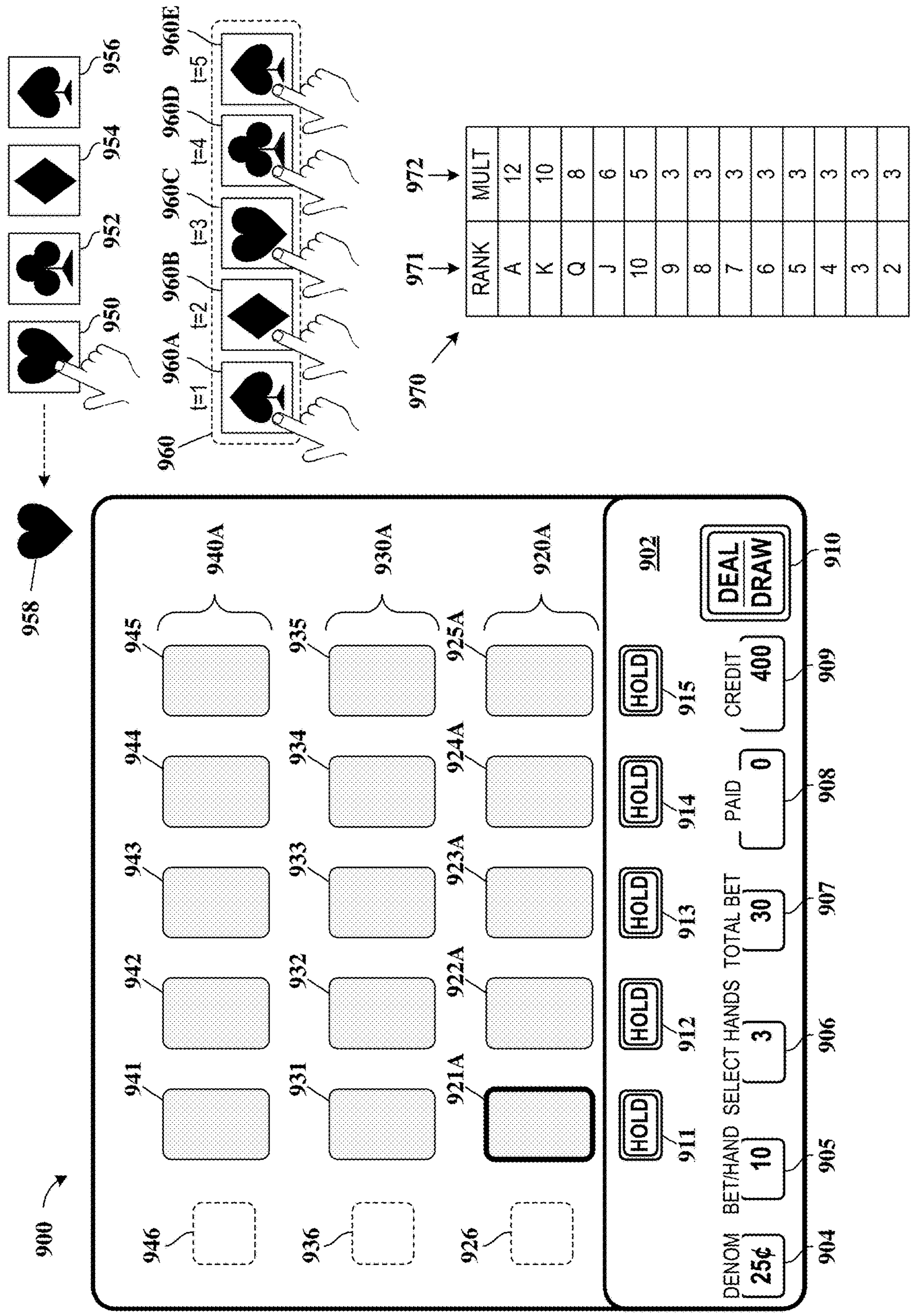
FIGS. 9A, 9B, and 9C collectively depict an example of a multi-play poker game utilizing a player-selectable card characteristic to enable payout enhancements.
Figure 9B:
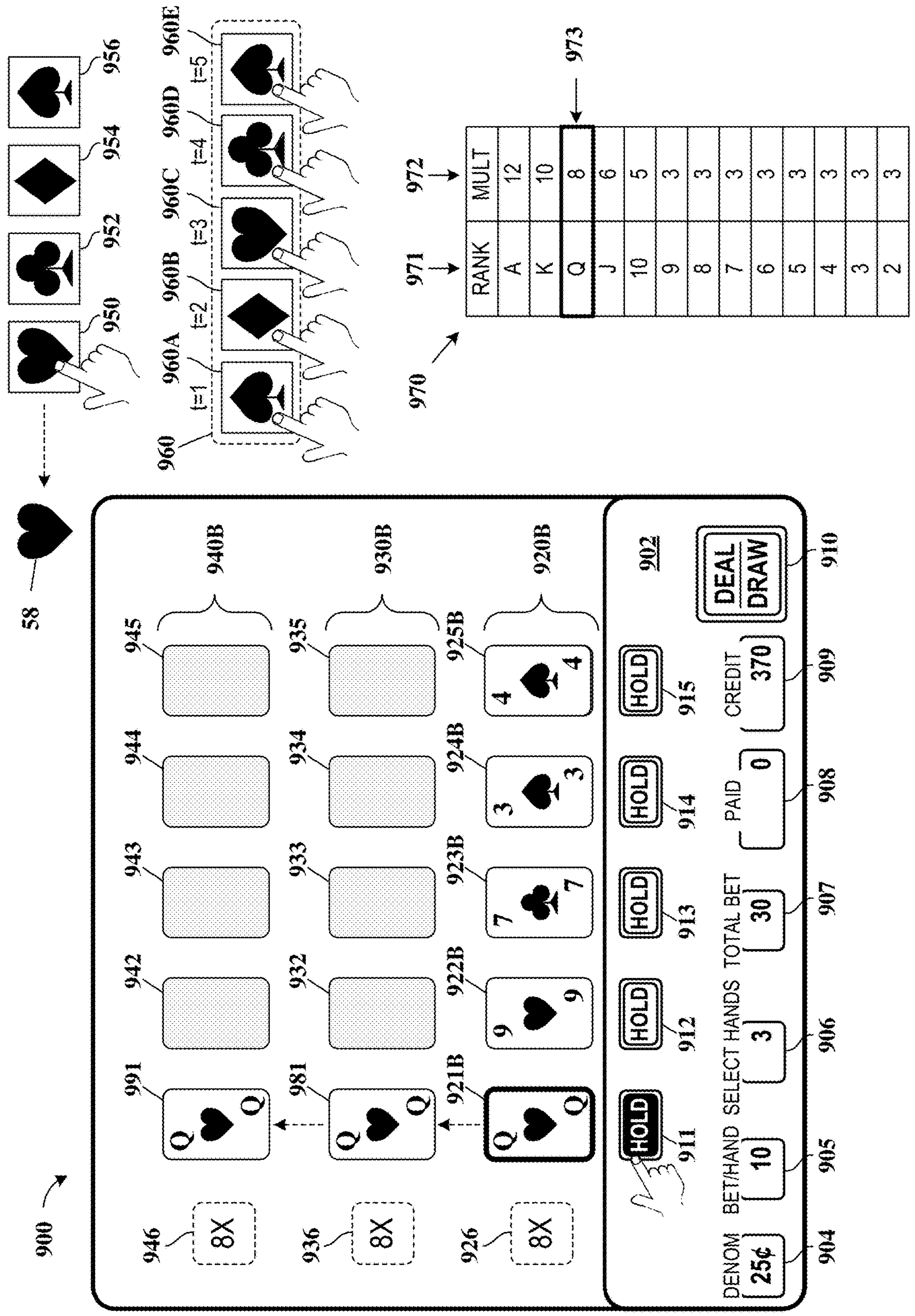
Figure 9C:
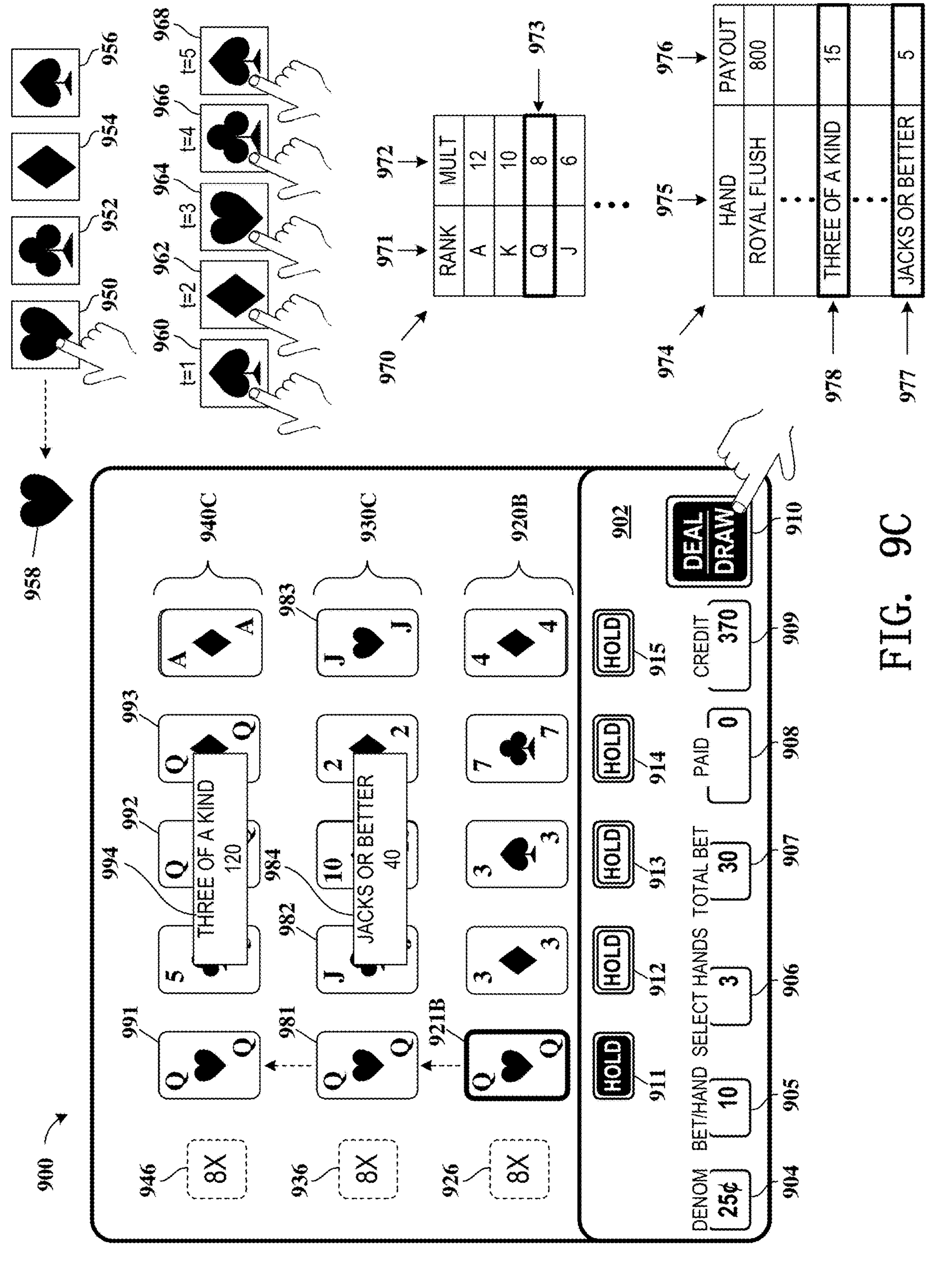

FIGS. 9A, 9B, and 9C collectively depict an example of a multi-play poker game utilizing a player-selectable card characteristic to enable payout enhancements. A display 900 visually presents the poker game, whereby the player interacts therewith via a user interface 902. The user interface 902 may include selectable and/or viewable items such as, for example, a denomination 904, the credit bet per hand 905, the number of hands played 906, the total wager 907, a payout amount 908, banked credits 909, and a deal/draw 910 activator. Additionally, in draw poker embodiments, hold indicators 911, 912, 913, 914, 915 may be provided by each card (of hand 920A for example) to enable a decision whether to hold each of the respective cards 921A, 922A, 923A, 924A, 925A.

The display 900 visually presents the three hands 920A, 930A, 940A in this representative triple-play poker environment. Each of the cards of the hands 920A, 930A, 940A are depicted in the illustrated embodiment as beginning face down, or otherwise not revealed to the player. Hand 920A includes cards 921A, 922A, 923A, 924A and 925A; hand 930A includes cards 931, 932, 933, 934 and 935; and hand 940A includes cards 941, 942, 943, 944 and 945.

In accordance with one embodiment, the player is allowed to select a card characteristic, such as prior to revealing at least the card(s) at a designated position(s) in which the player is predicting the card characteristic(s). For example, a portion of the user interface 902 (and/or on a separate user interface), the player may be presented with four selectable card suits 950, 952, 954, 956, where the player can select one of the card suits. As depicted in FIG. 9A, the player has selected the heart user interface item 950, thereby selecting Hearts 958 as the predicted card suit to be presented for card 921A when it is revealed.

Another representative manner of indicating the predicted suit is depicted as a toggle item 960, including selectin states 960A, 960B, 960C, 960D, and 969E, whereby the player changes to the selectable card suit (or other predicted characteristic in other embodiments) each time the toggle item 960 is selected. For example, at a first time t=1 depicted at state 960A, the Spade card suit is presented when touched. If the player does not touch the toggle item 960 again, then Spades will be the selected, predicted card suit. If the player touches the toggle item 960 again at time t=2, the selection changes to another card suit (Diamonds in this example) at state 960B. If the player touches the toggle item 960 again at time t=3, the selection changes to another card suit (Hearts in this example) at state 960C. If the player touches the toggle item 960 again at time t=4, the selection changes to another card suit (Clubs in this example) at state 960D. If the player touches the toggle item 960 again at time t=5, the selection returns to the first card suit (Spades in this example) at state 960E, and the process continues. Any other manner of indicating the predicted suit may be utilized (e.g. other entry manners whether visible, touch, mechanisms, audio, etc.), and those depicted in FIG. 9A are illustrated merely for purposes of illustration.

For purposes of this example, it is assumed that the player has selected Hearts 958 as the predicted card suit for the card 921A that will be revealed after the player's selection. In the illustrated example, if the player correctly predicts that card 921A will be a Heart, then all of the hands 920A, 930A, 940A will receive a multiplier 972 depending on the card rank 971 as (in one embodiment) provided in a card rank-multiplier table 970. In one embodiment, such awarded multiplier 972 may be presented proximate each of the hands 920A, 930A, 940A such as depicted by dashed multiplier presentation areas 926, 936, 946 respectively.

Thus, FIG. 9A depicts the stage of the poker game play where the player has made (and in some embodiments paid for) a guess as to what card suit will be associated with the face up card 921A. If the player activates the deal/draw mechanism 910, cards will be dealt to at least the hand 920A as depicted in FIG. 9B. FIG. 9B thus depicts a next stage where the cards of hand 920A of FIG. 9A are dealt or otherwise revealed (e.g. turned face up), which are depicted as cards 921B, 922B, 923B, 924B and 925B of hand 920B (where hand 920B corresponds to the next stage of cards of hand 920A of FIG. 9A). In this example, the Queen of Hearts 921B was presented at the designated position to compare against the predicted card suit (Hearts in this example), thereby resulting in a successful prediction by the player. Consulting the card rank-multiplier table 970, the player has been awarded with a multiplier of 8, as seen in the Queen-8 row 973 of the card rank-multiplier table 970, which in one embodiment is visually presented via the multiplier presentation areas 926, 936, 946 respectively. Therefore, in this embodiment, the player will receive an 8× (eight times) multiplier for any payouts provided in any of the hands 920B, 930B, 940B.

As this example represents a triple play poker embodiment where holding a card in the first hand 920B results in its replication into corresponding positions of the remaining hands 930B, 940B, the player has opted to hold the Queen of Hearts 921B, which is replicated as cards 981 and 991 of hands 930B and 940B respectively. FIG. 9C depicts a next stage where the player has activated the deal/draw mechanism 910 to replace or "draw" those cards not held in hand 920B, and those cards not receiving the replicated held cards in hands 930A, 940A. In this example, hand 920B did not receive a payout as it did not result in a payable hand result. Hand 930C resulted in a pair of Jacks (cards 982 and 983 obtained as replacement cards). According to the paytable 974, a hand 975 receives a payout 976 of 5 credits as depicted at row 977. Therefore, because the player obtained an 8× multiplier shown at multiplier presentation area 936, the player's total payout is 40 credits (i.e. 5 credits for the Jacks-or-Better payout times the awarded 8× multiplier), which may be presented 984 to the player. Further, hand 940C received Three-of-a-Kind in Queens (i.e. cards 991, 992, 993) from the held card and two replacement cards. According to the paytable 974, a hand 975 receives a payout 976 of 15 credits as depicted at row 978. Therefore, because the player obtained an 8× multiplier shown at multiplier presentation area 946, the player's total payout is 120 credits (i.e. 15 credits for the Three-of-a-Kind payout times the awarded 8× multiplier), which may be presented 994 to the player.

While any wagering scheme may be used in the example of FIGS. 9A-9C it is assumed that a first wager is placed to play each hand, and more credits are allocated to participate in the payout enhancement feature. As one example, one to five credits may be placed to play each hand, and one to five credits may be wagered for each hand to participate in the payout enhancement feature. In the present example, a 5+5 wager scheme is assumed, where the player pays 5 credits to play each of the 3 hands, and an additional 5 credits per hand to participate in the payout enhancement feature, for a total bet of 30 credits.

As previously noted, one embodiment involves forwarding an awarded multiplier or other player benefit to one or more other hands of a currently-played multi-hand game. This may be done in addition to or in lieu of providing the modifier or other benefit to the hand(s) to which the award is generated (e.g. the first hand having a designated position that is checked against the player's prediction(s)), and/or in addition to or in lieu of providing the modifier or other benefit to other poker events (e.g. the next or other subsequent poker hand(s) played). The example of FIGS. 10A-10E depicts one example where an awarded multiplier progresses through hands of a multi-play poker game on each successive poker game played and wagered on.

Figures 10A, 10B, 10C, 10D, 10E:
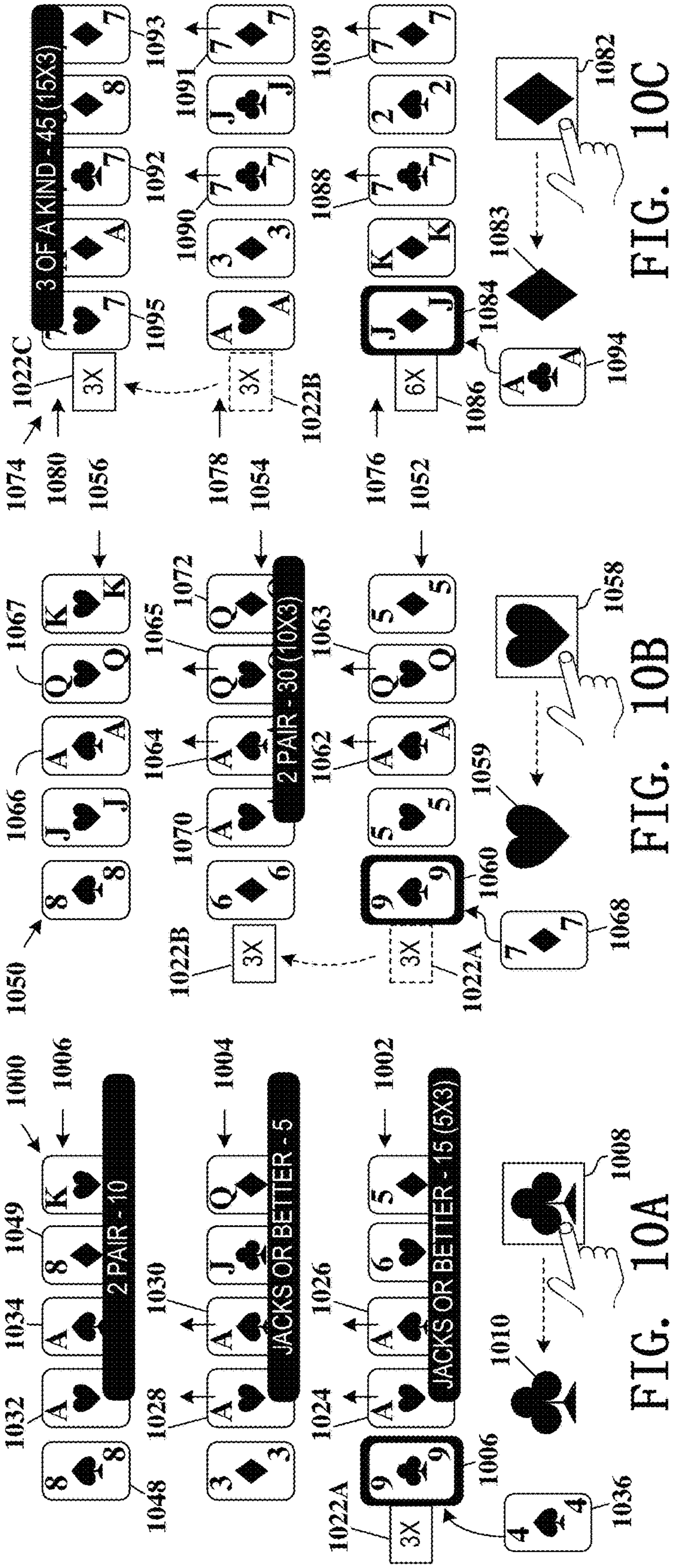
FIGS. 10A-10E depict a representative example where an awarded payout modifier progresses through hands of a multi-play poker game on successively-played poker games.

Particularly, FIG. 10A depicts a first multi-play poker game 1000 including concurrently-played hands 1002, 1004, 1006 in which the player wagered to play, and in this example also wagered to be eligible for the payout enhancement features described herein. The player chose the selectable card suit 1008 to select Clubs 1010 as a predicted card characteristic, which in one embodiment occurred before any cards of the poker game 1000 where presented face up, or at least before the card 1012 was presented face up since that is, in this example, the card that is compared to the predicted card characteristic to determine whether the player receives a payout modifier. The 9 of Clubs is the card 1006, and since the player has predicted that a Club 1010 would be dealt there, the player receives a 3× multiplier as seen in FIG. 10E, namely on row 1014 of the table 1016 that shows correlations of card value/rank 1018 and multiplier values 1020 for correctly predicted card suits.

Thus, for hand 1002 of FIG. 10A, the player received a 3× 1022A multiplier that is applied to winning payouts for hand 1002. In FIG. 10A, it is assumed that the player held cards 1024, 1026 (a pair of Aces), that are replicated into cards 1028, 1030 of hand 1004, and cards 1032, 1034 of hand 1006. As this example is a multi-play draw poker game, replacement cards are depicted as already having been provided for all cards that were not held cards or replicated held cards (including replacing the original non-held 9 of Clubs card 1006 with a replacement 4 of Spades card 1036, which is shown separately to enable visualization of the initial card 1006 serving as the basis for the comparison to the selected Club 1010 suit). Based on the paytable 1038 of FIG. 10D, row 1040 shows that a Jacks or Better hand 1042 provides a payout 1044 of 5 credits, which is multiplied by the 3× multiplier 1022A since the player had correctly predicted a Club 1010 to be first dealt to hand 1002 as the 9 of Clubs card 1006. Accordingly, the 5 credit win provides a total of 15 credits (5 credits won times the 3× multiplier). Hand 1004 also received Jacks or Better with the held/replicated Ace cards 1028, 1030, but only received the 5 credit win since this embodiment propagates the multiplier through the hands 1004, 1006 on subsequent wagered poker plays. Similarly, hand 1006 received 2 Pair, which as row 1046 of paytable 1038 of FIG. 10D shows to provide a payout 1044 of 10 credits, but is not enhanced as the 3× multiplier 1022A has not yet propagated to hand 1006 where it can be used (in this embodiment). The 2 Pair for hand 1006 includes the held/replicated Ace cards 1032, 1034, and two drawn Eight cards 1048, 1049.

On the next multi-play poker game 1050 wagered on by the player as shown in FIG. 10B, the 3× multiplier from hand 1002 of FIG. 10A is moved to the second hand 1054 as depicted by 3× multiplier 1022B. The player may have also opted to again choose a selectable card suit 1058 to guess whether the designated card(s) 1060 matches the predicted card suit 1059. In the example of FIG. 10B, the designated card 1060 is a 9 of Spades, which does not match the predicted card suit 1059 of Hearts, and therefore no new multiplier will be applied to hand 1052. After holding the Ace of Spades card 1062 and the Queen of Hearts card 1063, and having those cards replicated into cards 1064, 1065 of hand 1054 and into cards 1066, 1067 of hand 1056, the remaining non-held cards are replaced with new cards (including replacing the original non-held 9 of Spaces card 1060 with a replacement 7 of Diamonds card 1068, which is shown separately to enable visualization of the initial card 1060 serving as the basis for the comparison to the selected Heart 1059 suit).

As seen in the example of FIG. 10B, only hand 1054 received a winning hand, which includes the replicated Ace and Queen cards 1064, 1065, as well as replacement Ace and Queen cards 1070, 1072, thereby forming 2 Pair. According to the representative paytable 1038 of FIG. 10D, the hand 1042 of 2 Pair shown on row 1045 provides a 10 credit payout 1044. Since the 3× multiplier 1022B had propagated up from the first hand 1002 of poker game 1000 (FIG. 10A) to second hand 1054 of poker game 1050 (FIG. 10B), the 2 Pair result of 10 credits is multiplied by three to provide a 30 credit total payout.

On the next multi-play poker game 1074 wagered on by the player as shown in FIG. 10C, the 3× multiplier from hand 1002 of FIG. 10A, which on the last poker game 1050 (FIG. 10B) had moved to the second hand 1054, is moved to the next/third hand 1080 as depicted by the 3× multiplier 1022C of FIG. 10C. The player may have also opted to again choose a selectable card suit 1082 to guess whether the designated card(s) 1084 matches the predicted card suit 1083. In the example of FIG. 10C, the designated card 1084 is a Jack of Diamonds, which matches the predicted card suit 1083 of Diamonds, and therefore a new multiplier 1086 will be applied to hand 1076. Based on the table 1016 of FIG. 10E, the new multiplier 1086 is a 6× multiplier as depicted by row 1015, and thus hand 1076 will receive a 6× multiplier 1086 to apply to any winning payout on hand 1076.

The 7 cards 1088 and 1089 are held in hand 1076, and replicated into cards 1090, 1091 of hand 1078, and into cards 1092, 1093 of hand 1080. As previously noted, hand 1080 will receive a 3× multiplier 1022C to apply to any winning payout on hand 1080. Hand 1078 is not receiving any multiplier for poker game 1074. The remaining non-held cards are replaced with new cards (including replacing the original non-held Jack of Diamonds with a replacement Ace of Clubs card 1094, which is shown separately to enable visualization of the initial card 1084 serving as the basis for the comparison to the selected Diamond 1083 suit).

As seen in the example of FIG. 10C, only hand 1080 received a winning hand, which includes the replicated 7 cards 1092, 1083, and a replacement 7 card 1095, thereby forming Three of a Kind. According to the representative paytable 1038 of FIG. 10D, the hand 1080 of Three of a Kind on row 1046 provides a 15 credit payout 1044. Since the 3× multiplier 1022C had propagated up from the first hand 1002 of poker game 1000 (FIG. 10A), to the second hand 1054 of poker game 1050 (FIG. 10B), and now to the third hand 1080 of poker game 1074 (FIG. 10C), the Three of a Kind result of 15 credits is multiplied by three to provide a 45 credit total payout. Had a winning result occurred on hand 1078 of FIG. 10C, the payout would not have been enhanced as no payout modifier (e.g. multiplier in this example) is associated with hand 1078 for this poker game 1074. On the other hand, had a winning result occurred on hand 1076 of FIG. 10C, that payout would have been enhanced, as the new 6× multiplier 1094 had been awarded based on the new, correct prediction of Diamonds 1083 for the card 1084 dealt to the designated position.

As described herein, the disclosure sets forth representative manners of enabling poker hand payouts to be increased or otherwise enhanced by comparing a user-predicted or system-generated characteristic, such as a poker card or poker game characteristic, to a corresponding characteristic that may randomly occur.

In one embodiment, a selection of a characteristic or variable is made prior to the poker hand deal, or at least prior to the card or gaming element to which the characteristic or variable will be compared. Depending on whether the selected characteristic or variable actually occurs, a winning payout enhancer or other payout modifier is awarded. The payout modifier may be awarded to one or more hands of the current poker event (e.g., the current single hand, or current multiple hands in a multi-play context).

The payout modifier may instead or additionally be awarded to one or more hands of a subsequent poker hand(s), whether immediately subsequent or later. For example, in one embodiment, the payout modifier may be "banked" or otherwise stored for use later. In one embodiment, the user could decide when a stored payout modifier may be used, in another embodiment, the user may be randomly provided with the previously awarded payout modifier. In still other embodiments, a stored payout modifier may be provided to the user based on certain rules, such as when a poker result payout meets some threshold (e.g., above a payout threshold, at a payout threshold, below a payout threshold, etc.), or on the next occurrence of a particular poker result(s) (e.g., used on the next flush, or used on the next four-of-a-kind, etc.), or used on the next play where maximum credits are played (which could, in some embodiments, result in loss of the stored payout modifier if there was no win on the maximum credit play), or any other rules created in which to award the payout modifier.

In one particular embodiment, a player can pick their lucky card color, either red or black. If the deal results in that color card in a particular hand position (e.g., the first position of the hand from left to right), then an award is provided. In some embodiments, the award may be independent of any other award (e.g., an award of X credits), where in other embodiments, the award is mathematically applied to a poker hand payout(s), such as multiplying times the payout, using the award to exponentially increase a poker hand payout(s), etc.

One embodiment involves facilitating selection of one of a plurality of card characteristics, presenting a hand(s) of cards, determining whether the selected card characteristic is exhibited on a particular one of the cards in the hand, determining if the hand of cards corresponds to a winning hand having a payout value, and providing an enhancement value to be applied to the payout value if the selected one of the plurality of card characteristics is exhibited on the predetermined one of the cards in the hand.

In some embodiments, the player may select a plurality of characteristics, such as card color and card rank (e.g., face card or not face card). A payout modifier may, in some embodiments, be awarded a first modifier if the player guesses correctly for one of the plurality of characteristics (e.g., a 2× multiplier if guessed card color correctly but card rank incorrectly), and a second modifier if the player guesses correctly for both of the plurality of characteristics (e.g., a 5× multiplier if guessed card color correctly and card rank correctly). In other embodiments, it may be required that the player guess all of the plurality of characteristics correctly in order to receive the payout modifier or other award.

The principles described herein are applicable to any poker games that involve presenting cards (including electronic card indicia) where a final poker hand may be compared to a paytable or otherwise determine poker hand winnings. Thus, while draw poker and stud poker may be most often used in the described embodiments, the principles are applicable to any poker variant, including but not limited to draw poker, stud poker, Hold'em poker or Omaha poker (e.g., the player predicts the color of a hole card(s) and/or a card(s) on the board with a side-bet against the house), triple draw poker, Chinese poker, etc. Any electronic poker game where card characteristics or another characteristic(s) relating to the particular poker game may benefit from the payout enhancement features described herein.

Figure 11:
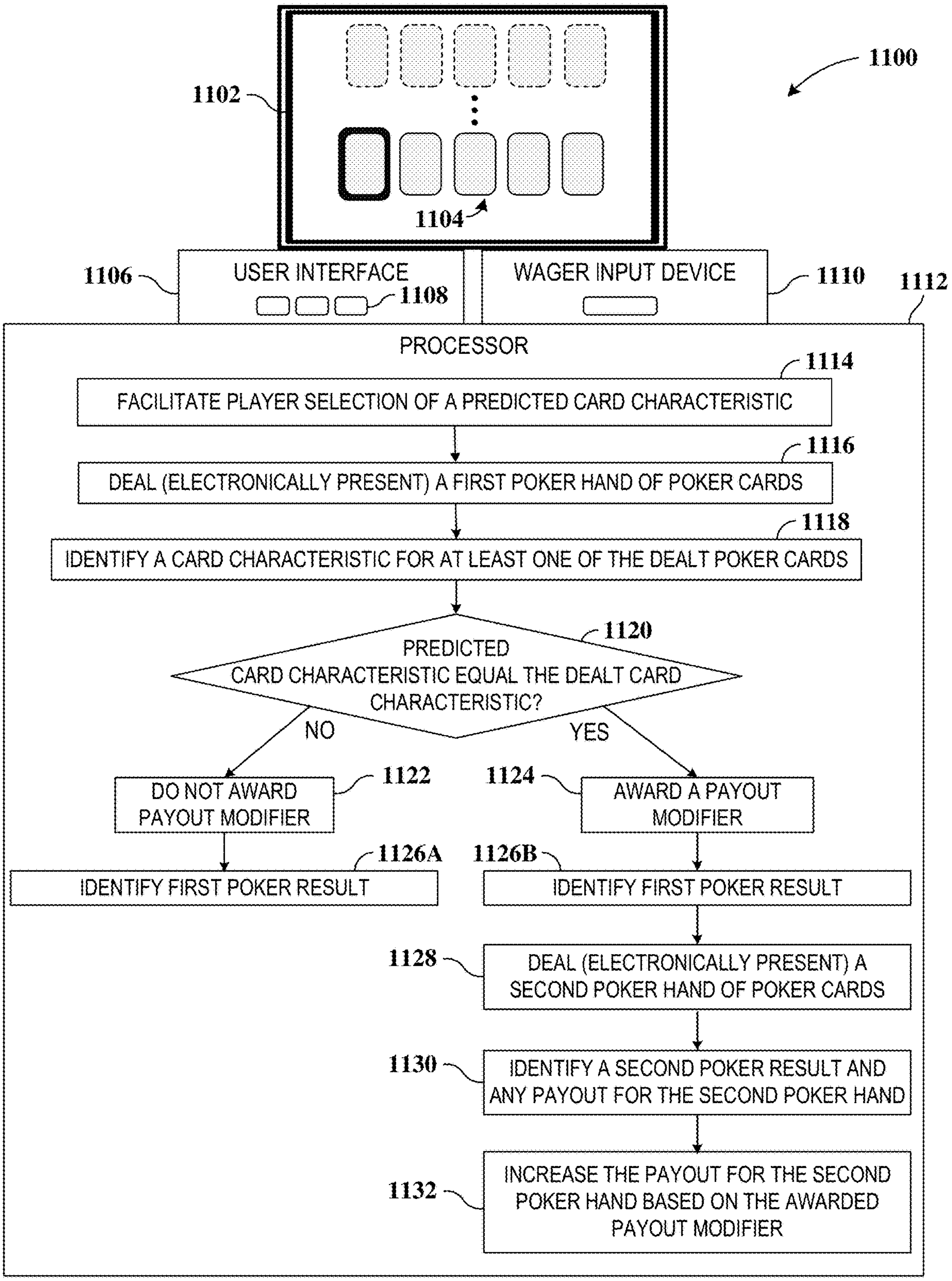
FIG. 11 is a block diagram of a representative gaming apparatus for enhancing poker payouts based on the success of player predictions.

FIG. 11 is a block diagram of a representative gaming apparatus for enhancing poker payouts based on the success of player predictions. In the embodiment of FIG. 11, a poker device (e.g., video poker machine) 1100 is provided on which players can play poker games. The representative poker device 1100 includes at least a display(s) 1102 presenting a single or multiple poker hands 1104. A user interface 1106 is provided that includes at least one user input 1108 to enable a player to initiate and participate in poker hands 1104 presented via the display 1102, and a wager input device 1110 structured to identify and validate player assets and ultimately permit the player to play the poker game events when the player assets are provided.

A processor 1112 is configured to, in one embodiment, facilitate 1114 player selection of a predicted card characteristic(s) from a plurality of available card characteristics. A first poker hand is dealt 1116 that includes a first plurality of poker cards. A card characteristic is identified 1118 among the plurality of available card characteristics for a poker card of the first plurality of poker cards that is dealt to a particular position of the first poker hand. If a comparison of the predicted card characteristic and the dealt card characteristic results in no match as determined at decision block 1120, no payout modifier is awarded 1122, whereby the first poker result may be identified 1126A. In the illustrated embodiment of FIG. 11, if the comparison at block 1120 results in a match of the predicted card characteristic and the dealt card characteristic, a payout modifier is awarded 1124, and the first poker result may be identified 1126B. If/when a subsequent poker hand is played by the player, that subsequent poker hand is dealt 1128, the subsequent poker hand result and any associated payout result is identified 1130, and such payout of that subsequent poker hand is increased 1132 by the payout modifier that was awarded 1124 in the prior poker hand.

Such processor 1112 may be configured to cause the gaming device 1100 to represent other embodiments. For example, the processor 1112 may be configured to facilitate player selection of a predicted card characteristic from a plurality of available card characteristics, deal a multi-play poker game including a plurality of concurrently played poker hands each including a respective plurality of poker cards, identify a dealt card characteristic among the plurality of available card characteristics for one of the poker cards dealt to a particular position one of the concurrently played poker hands, compare the predicted card characteristic and the dealt card characteristic, and award a payout modifier to each of the concurrently played poker hands of the multi-play poker game if the comparison results in a match of the predicted card characteristic and the dealt card characteristic.

The embodiments of FIG. 11 are representative embodiments among numerous embodiments described in this Specification. FIG. 11 and any other diagrams depicting a process flow represent operations in which a gaming device and/or gaming system can be operated according to representative embodiments. Although various processes may be depicted in a particular order, the order of these operations can be changed in other embodiments without deviating from the scope or spirit of this concept. Accordingly, the order of the processes shown is for illustrative purposes only and is not meant to be restrictive. Additional game processes may also be included between various processes even though they are not shown in these operational processes for purposes of clarity. The operations or processes may be performed by components in a single game device, such as by a game processor(s), or may be performed in part or whole by a remote server or processor(s) connected to the gaming device via a network. Each operation or process may be encoded in instructions that are stored in one or more memories, a computer-readable medium(s), or another type of storage device(s). The exemplary operations and methodologies depict representative embodiments of how game operations may be implemented. As discussed herein, many variations exist which may require additional, fewer, or different processes to complete.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention covers alternatives, modifications, and equivalents that come within the scope and spirit of the principles set out herein and/or in the appended claims.

What is claimed is:

1. A method of operating a video poker gaming machine including a cabinet, a display mounted to the cabinet and configured to display poker games to a player of the video poker gaming device, a player input device attached to the cabinet and configured to receive inputs from a player, a wager input device mounted to the cabinet and structured to receive physical items associated with a currency value, a memory housed inside the cabinet and configured to store a credit amount as well as at least one virtual deck of cards and a current predicted card suit, and a processor housed inside the cabinet, the method comprising:

receiving a signal that a physical item has been received by the wager input device;

incrementing the credit amount in the memory based on the currency value associated with the received physical item;

receiving a signal to initiate a poker gaming event in response to placement of a wager, the wager decreasing the credit amount;

dealing a first poker hand including a first plurality of poker cards;

identifying a dealt card suit for a poker card of the first plurality of poker cards that is dealt to a particular position of the first poker hand;

comparing the current predicted card suit and the dealt card suit;

if the comparison results in a match of the current predicted card suit and the dealt card suit, awarding a random multiplier;

identifying a first poker result of playing the first poker hand, and award a first poker result payout if the identified first poker result corresponds to a predetermined poker result having the first poker result payout associated therewith; and increasing the first poker result payout based on the awarded multiplier obtained in connection with play of the first poker hand, if the multiplier was awarded in connection with play of the first poker hand as a result of the current predicted card suit and the dealt card suit matching.

2. The method of claim 1, further comprising:

dealing at least one second poker hand including a second plurality of poker cards;

identify a second poker result of playing the second poker hand, and award a second poker result payout if the identified second poker result corresponds to a predetermined poker result having the second poker result payout associated therewith; and increasing the second poker result payout based on the awarded multiplier obtained in connection with play of the first poker hand, if the multiplier was awarded in connection with play of the first poker hand as a result of the current predicted card suit and the dealt card suit matching.

3. The method of claim 1, further comprising facilitating player selection of the current predicted card suit prior to dealing the first poker hand in the poker gaming event.

4. The method of claim 3, wherein facilitating player selection of the current predicted card suit prior to dealing the first poker hand in the poker gaming event includes providing a button configured to be activated by the player prior to dealing the first poker hand in the poker gaming event, and changing the current predicted card suit only upon the button being activated and a new predicted card suit being selected.

5. A method of operating a video poker gaming device including a display configured to display poker games to a player of the gaming device, a player input device configured to receive inputs from a player, a wager input device structured to identify and validate currency or currency based tickets, and a processor, the method comprising:

facilitating player selection of a predicted card characteristic from a plurality of available card characteristics;

dealing a first poker hand including a first plurality of poker cards;

identifying a dealt card characteristic among the plurality of available card characteristics for a poker card of the first plurality of poker cards that is dealt to a particular position of the first poker hand;

comparing the predicted card characteristic and the dealt card characteristic;

if the comparison results in a match of the predicted card characteristic and the dealt card characteristic, awarding a payout modifier;

identifying a first poker result of playing the first poker hand, and award a first poker result payout if the identified first poker result corresponds to a predetermined poker result having the first poker result payout associated therewith;

dealing at least one second poker hand including a second plurality of poker cards;

identifying a second poker result of playing the second poker hand, and award a second poker result payout if the identified second poker result corresponds to a predetermined poker result having the second poker result payout associated therewith; and increasing the second poker result payout based on the awarded payout modifier obtained in connection with play of the first poker hand, if the payout modifier was awarded in connection with play of the first poker hand as a result of the predicted card characteristic and the dealt card characteristic matching.

6. The method of claim 5, wherein the plurality of available card characteristics includes a choice of a red-suited card characteristic and a black-suited card characteristic.

7. The method of claim 5, wherein the plurality of available card characteristics includes a choice of a heart suit card characteristic, a diamond card characteristic, a club suit characteristic, and a spade suite card characteristic.

8. The method of claim 5, wherein the plurality of available card characteristics includes a choice of card ranks.

9. The method of claim 5, wherein the plurality of available card characteristics includes a choice of a face card characteristic and a non-face card characteristic.

10. The method of claim 5, wherein the payout modifier includes a multiplier value used to multiply any second poker result payout.

11. The method of claim 10, wherein the multiplier value is selected at random.

12. The method of claim 10, wherein the multiplier value awarded in the first poker game is reset to a predefined initial value when a previous poker game did not award a payout modifier.

13. The method of claim 12, wherein the multiplier value awarded in the first poker game is incrementally increased according to a predetermined algorithm from a previously awarded payout modifier when a previous poker game did result in the awarding of the previously awarded payout modifier.

14. The method of claim 5, wherein the payout modifier includes a bonus credit award that is added to any second poker result payout.

* * * * *